US012414071B2

(12) United States Patent
Manolakos et al.

(10) Patent No.: US 12,414,071 B2
(45) Date of Patent: Sep. 9, 2025

(54) UPDATING USER EQUIPMENT'S POSITIONING CAPABILITIES DURING POSITIONING SESSION

(71) Applicant: QUALCOMM Incorporated, San Diego, CA (US)

(72) Inventors: Alexandros Manolakos, Escondido, CA (US); Mukesh Kumar, Hyderabad (IN); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/996,431

(22) PCT Filed: Jun. 7, 2021

(86) PCT No.: PCT/US2021/036217
§ 371 (c)(1),
(2) Date: Oct. 17, 2022

(87) PCT Pub. No.: WO2021/252377
PCT Pub. Date: Dec. 16, 2021

(65) Prior Publication Data
US 2023/0156655 A1    May 18, 2023

(30) Foreign Application Priority Data

Jun. 10, 2020   (GR) .............................. 20200100319

(51) Int. Cl.
*H04W 64/00*   (2009.01)
*H04W 8/24*    (2009.01)

(52) U.S. Cl.
CPC ............. *H04W 64/00* (2013.01); *H04W 8/24* (2013.01)

(58) Field of Classification Search
CPC ................................ H04W 64/00; H04W 8/24
(Continued)

(56) References Cited

U.S. PATENT DOCUMENTS

| 8,712,439 B2 | 4/2014 | Farmer et al. |
| 8,848,653 B2 | 9/2014 | Edge et al. |

(Continued)

FOREIGN PATENT DOCUMENTS

| WO | 2007109695 | 9/2007 |
| WO | 2009089486 | 7/2009 |

OTHER PUBLICATIONS

"3rd Generation Partnership Project, Technical Specification Group Radio Access Network, Evolved Universal Terrestrial Radio Access (E-UTRA), LTE Positioning Protocol (LPP) (Release 15)", 3GPP Standard, Technical Specification, 3GPP TS 36.355, 3rd Generation Partnership Project, Mobile Competence Centre, 650, Route Des Lucioles, F-06921 Sophia-Antipolis Cedex, France, vol. RAN WG2, No. V15.5.0, Sep. 30, 2019, pp. 1-224, XP051785102, Clauses 4.3.5-5.5.3, p. 28, p. 49-p. 50, p. 15, p. 53.

(Continued)

*Primary Examiner* — Sam K Ahn
(74) *Attorney, Agent, or Firm* — QUALCOMM Incorporated

(57) ABSTRACT

Methods, systems, computer-readable media, and apparatuses for UE positioning are described. In some embodiments, a UE is configured to perform positioning measurements according to capabilities of the UE. Over time, the capabilities may change. Based on a change, the UE reports, to a location server, an indication that the capabilities have changed. This indication can include updated capabilities information or an error related to previously reported capabilities information and/or availability of the updated capabilities information. In turn, the location server may indicate, to the UE, updated assistance data and/or a request for updated location information, such that next position measurements performed by the UE may be based on the updated assistance data and/or the request.

26 Claims, 17 Drawing Sheets

(58) Field of Classification Search
USPC ........................................................ 455/456.2
See application file for complete search history.

(56) References Cited

U.S. PATENT DOCUMENTS

| | | | |
|---|---|---|---|
| 2012/0040687 A1* | 2/2012 | Siomina | G01S 5/019 |
| | | | 455/422.1 |
| 2015/0018010 A1 | 1/2015 | Fischer | |
| 2015/0296359 A1 | 10/2015 | Edge | |
| 2016/0286009 A1 | 9/2016 | Edge et al. | |
| 2018/0343635 A1 | 11/2018 | Edge et al. | |

OTHER PUBLICATIONS

"3rd Generation Partnership Project, Technical Specification Group Radio Access Network, Evolved Universal Terrestrial Radio Access Network (E-UTRAN), Stage 2 functional specification of User Equipment (UE) positioning in E-UTRAN (Release 16)", 3GPP Standard, Technical Specification, 3GPP TS 36.305, 3rd Generation Partnership Project, Mobile Competence Centre, 650, Route Des Lucioles, F-06921 Sophia-Antipolis Cedex, France, vol. RAN WG2, No. V16.0.0, Apr. 8, 2020, pp. 1-91, XP051893877.

"3rd Generation Partnership Project, Technical Specification Group Radio Access Network, NR, Requirements for support of Assisted Global Navigation Satellite System (A-GNSS) (Release 15)", 3GPP Standard, Technical Specification, 3GPP TS 38.171, 3rd Generation Partnership Project (3GPP), Mobile Competence Centre, 650, Route Des Lucioles, F-06921 Sophia-Antipolis Cedex, France, No. V15. 3.0, Apr. 8, 2020 (Apr. 8, 2020), pp. 1-39, XP051893921, Clauses 5.5 -5.5.1 and 6.5-6.5.1.

Huawei., et al., "LPP Corrections on UE Capability Signalling", 3GPP TSG-RAN WG2 Meeting #112 electronic, 3GPP Draft, R2-2010265, 3rd Generation Partnership Project (3GPP), Mobile Competence Centre, 650, Route Des Lucioles, F-06921 Sophia-Antipolis Cedex, France, vol. Ran WG2, No. Electronic; Nov. 2, 2020-Nov. 13, 2020, Oct. 23, 2020 (Oct. 23, 2020), 9 Pages, XP051942945, Sections 1.1-1.4.

International Search Report and Written Opinion—PCT/US2021/036217—ISA/EPO—Sep. 22, 2021.

Qualcomm Incorporated: "Summary of LPP Corrections Agenda Item 6.6.3", 3GPP TSG-RAN WG2 Meeting #112-e, 3GPP Draft, R2-2010975, 3rd Generation Partnership Project (3GPP), Mobile Competence Centre, 650, Route Des Lucioles, F-06921 Sophia-Antipolis Cedex, France, vol. RAN WG2, No. Electronic, Nov. 2, 2020-Nov. 13, 2020, Oct. 30, 2020 (Oct. 30, 2020), 5 Pages, XP051948577, Sections 2-3.4.

* cited by examiner

UPDATING USER EQUIPMENT'S POSITIONING CAPABILITIES DURING POSITIONING SESSION

CROSS-REFERENCE TO RELATED APPLICATION

This application is a U.S. National Stage which claims the benefit of International Application No. PCT/US2021/036217, filed Jun. 7, 2021, entitled "METHODS AND APPARATUSES FOR UPDATING USER EQUIPMENT'S POSITIONING CAPABILITIES DURING POSITIONING SESSION", which claims the benefit of priority from Greece Provisional Application No. 20200100319, filed Jun. 10, 2020, entitled "UPDATING USER EQUIPMENT'S POSITIONING CAPABILITIES DURING POSITIONING SESSION", both of which are assigned to the assignee hereof, and incorporated by reference herein in their entirety.

BACKGROUND

Field of Invention

Aspects of the disclosure generally relate to the field of wireless communications, and more specifically to updating user equipment's (UE's) positioning capability during a positioning session.

Description of Related Art

In a data communication network, such as a Fifth Generation New Radio (5G NR, also referred to herein as "NR", having requirements defined by the $3^{rd}$ Generation Partnership Project (3GPP)), positioning techniques can be used to determine the location of a mobile electronic device (referred to herein as a UE)). The UE may use wireless radio frequency (RF) signaling between the UE and transmission and reception points (TRPs) (e.g., base stations) of the data communication network to perform measurements for positioning and/or communicate those measurements to the data communication network.

Different methods are available to perform positioning measurements. Some of the positioning methods are based on downlink signals and include downlink time difference of arrival (DL-TDOA) measurements and downlink angle of departure (DL-AoD) measurements. Other positioning methods are based on uplink signals and include uplink time difference of arrival (UL-TDOA) measurements and uplink angle of arrival (UL-AoA) measurements. Yet other positioning methods include measurements related to both downlink signals and uplink signals, such as round-trip time (RTT) with one or more neighboring base stations. In addition, each of the base stations can be associated with an identifier (ID) of a cell that is covered by the base station. Positioning of the UE can involve radio resource management (RRM) measurements that use enhanced cell identifiers (E-CID).

To help with the UE positioning, sounding reference signals (SRS) for positioning, also referred to positioning reference signals (PRS) in release 16 of the 3GPP specifications, are defined and enable the UE to detect and measure more neighboring base stations. For example, base stations send PRS to the UE to improve observed time of arrival (OTDOA) in DL-TDOA measurements. The OTDOA of the PRS from a reference cell station (e.g., the serving cell) and one or more neighboring cells is known as the downlink (DL) reference signal time difference (RSTD). Using the DL RSTD measurements, the absolute or relative transmission timing of each cell, and the known position(s) of base station transmitting antenna element(s) for the reference and neighboring cells, the UE's position may be determined.

Other SRS and PRS-based measurements are also possible. For example, downlink PRS can be used for downlink (DL) PRS reference signal received power (RSRP) measurements in support of DL-TDOA, DL-AoD, or multi-RTT. SRS for positioning can be used for UE reception-transmission (Rx-Tx) time different measurements in support of multi-RTT.

The UE positioning can also use measurements other than SRS and PRS-based ones. For example, synchronization signal block (SSB) and channel state information reference signal (CSI-RS) for radio resources management (RRM)-based measurements can be used in E-CID methods.

SUMMARY

In some embodiments, a UE is configured to perform positioning measurements according to capabilities of the UE. Over time, the capabilities may change. Based on a change, the UE reports, to a location server, an indication that the capabilities have changed. This indication can include updated capabilities information or an error related to previously reported capabilities information and/or availability of the updated capabilities information. In turn, the location server may indicate, to the UE, updated assistance data and/or a request for updated location information, such that next position measurements performed by the UE may be based on the updated assistance data and/or the request.

An example method of sending location information of a user equipment (UE) in association with a positioning session between the UE and a location server, according to this disclosure, comprises sending, from the UE to the location server, UE capabilities information according to a first capability indication procedure, the UE capabilities information indicating parameters of the UE in support of: positioning reference signal (PRS) configurations, PRS measurements, positioning methods, or positioning procedures, or a combination thereof. The method also comprises subsequent to sending the UE capabilities information, determining, at the UE, an update to one or more of the parameters. The method also comprises sending, from the UE to the location server, an indication of the update according to a second capability indication procedure. The method also comprises measuring positioning reference signals at the UE based on the update. The method also comprises sending, from the UE to the location server, the location information based on the measuring.

An example method of enabling updated user equipment (UE) capabilities information in association with a positioning session between a UE and a location server, according to this disclosure, comprises receiving, at the location server from the UE, UE capabilities information according to a first capability indication procedure, the UE capabilities information indicating parameters of the UE in support of: positioning reference signal (PRS) configurations, PRS measurements, positioning methods, or positioning procedures, or a combination thereof. The method also comprises subsequent to receiving the UE capabilities information, receiving, at the location server from the UE, an indication of an update to one or more of the parameters, the indication of the update to one or more of the parameters received according to a second capability indication procedure. The method also comprises sending, from the location server to the UE, a message responsive to the indication of the update to one or more of the parameters, the message comprising: assistance data, based on the update to the one or more of the parameters, for the UE to use for measuring positioning reference signals, a request for location information, or a request for the updated UE capabilities information, or a combination thereof.

An example user equipment (UE) for sending location information in association with a positioning session between the UE and a location server, according to this disclosure, comprises a transceiver, a memory, one or more processors communicatively coupled with the transceiver and the memory, wherein the one or more processors are configured to send, via the transceiver to the location server, UE capabilities information according to a first capability indication procedure, the UE capabilities information indicating parameters of the UE in support of: positioning reference signal (PRS) configurations, PRS measurements, positioning methods, or positioning procedures, or a combination thereof. The one or more processing units are further configured to subsequent to sending the UE capabilities information, determining an update to one or more of the parameters. The one or more processing units are further configured to send, via the transceiver to the location server, an indication of the update to one or more of the parameters according to a second capability indication procedure. The one or more processing units are further configured to measure positioning reference signals at the UE based on the update. The one or more processing units are further configured to send, via the transceiver to the location server, the location information based on the measuring.

An example location server for enabling updated UE capabilities information in association with a positioning session between a UE and the location server, according to this disclosure, comprises a transceiver, a memory, one or more processors communicatively coupled with the transceiver and the memory, wherein the one or more processors are configured to receive, via the transceiver from the UE, UE capabilities information according to a first capability indication procedure, the UE capabilities information indicating parameters of the UE in support of: positioning reference signal (PRS) configurations, PRS measurements, positioning methods, or positioning procedures, or a combination thereof. The one or more processing units are further configured to subsequent to receiving the UE capabilities information, receiving, at the location server from the UE, an indication of an update to one or more of the parameters, the indication of the update to one or more of the parameters received according to a second capability indication procedure. The one or more processing units are further configured to send, via the transceiver to the UE, a message responsive to the indication of the update to one or more of the parameters, the message comprising: assistance data, based on the update to the one or more of the parameters, for the UE to use for measuring positioning reference signals, a request for location information, or a request for the updated UE capabilities information, or a combination thereof.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Embodiments of the present disclosure are directed to, among other things, improving UE positioning measurements. In an example, a UE indicates to a network, its capabilities to perform positioning measurements on signals during a positioning session with the network. The network provides assistance data to the UE and indicates particular parameters for positioning measurements that the UE performs. However, unlike existing communication systems, if the UE's capabilities change during the positioning session, the UE indicates the change to the network and, in turn, the network may change the assistance data and/or the parameters as needed and as possible. In this way, the positioning measurements can be dynamically adjusted and refined during the positioning session based on the updated UE's capabilities, thereby improving the positioning measurements.

In the interest of clarity of explanation, embodiments of the present disclosure are described in connection with PRS-based positioning measurements. However, the embodiments are not limited as such and similarly apply to other types of positioning measurements, including ones based on SRS for positioning, SSB for RRM, CSI-RS for RRM, and the like. Such positioning measurements may be performed according to resource allocations that may be adjusted based on the updated UE's capability. In addition, the positioning measurements are performed during a positioning session between the UE and the network in support of DL-TDOA, DL-AoD, UL-TDOA, UL-AoA, RTT, multi-RTT, and E-CID. Herein also, the terms "location" and "position" are used interchangeably.

Figure 1:
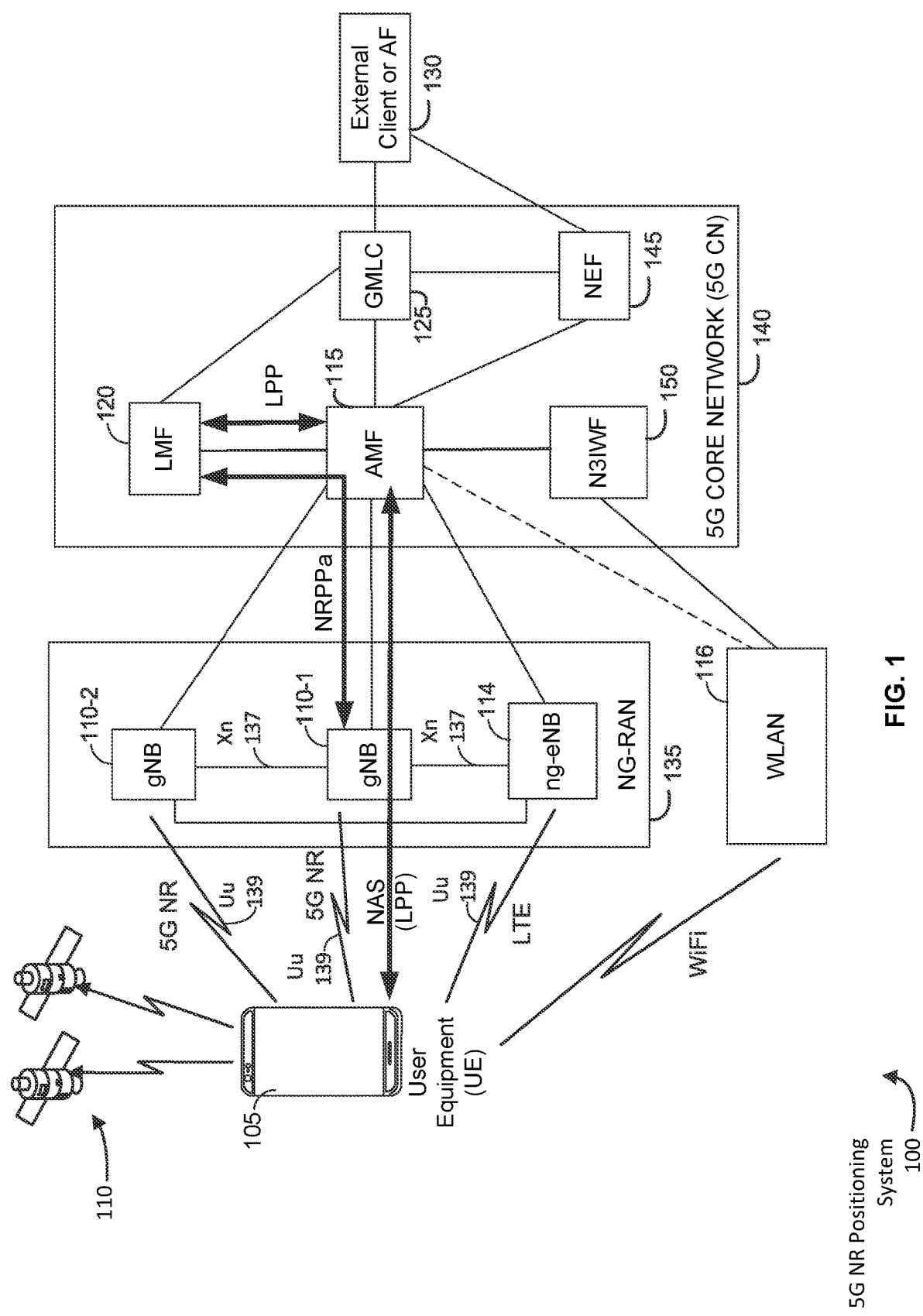
FIG. 1 illustrates an example of a diagram of a communication system, in accordance with at least one embodiment.

FIG. 1 illustrates an example of a diagram of a communication system 100, in accordance with at least one embodiment. The communication system 100 may be configured to determine the location of a UE 105 by using access nodes 110, 114, 116 and/or a location server (LMF 120) to implement one or more positioning methods. Here, the communication system 100 comprises a UE 105, and components of a 5G NR network comprising a Next Generation (NG) Radio Access Network (RAN) (NG-RAN) 135 and a 5G Core Network (5G CN) 140. A 5G network may also be referred to as an NR network; NG-RAN 135 may be referred to as a 5G RAN or as an NR RAN; and 5G CN 140 may be referred to as an NG Core network. The 5G NR positioning system 100 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 100 are described below. The 5G NR positioning system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of GNSS satellites 110, gNBs 110, ng-eNBs 114, Wireless Local Area Networks (WLANs) 116, Access and mobility Management Functions (AMF)s 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 135 and 5G CN 140), etc. The UE 105 may also support wireless communication using a WLAN 116 which may connect to other networks, such as the Internet. The use of one or more of these RATs may allow the UE 105 to communicate with an external client 130 (e.g., via elements of 5G CN 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below mean sea level).

Base stations in the NG-RAN 135 shown in FIG. 1 may comprise a Transmission Reception Point (TRP), such as a NR NodeB (gNB) 110-1 and 110-2 (collectively and generically referred to herein as gNBs 110). Pairs of gNBs 110 in NG-RAN 135 may be connected to one another (e.g., directly as shown in FIG. 1 or indirectly via other gNBs 110). The communication interface between base stations (gNBs 110 and/or ng-eNB 114) may be referred to as an Xn interface 137. Access to the 5G network is provided to UE 105 via wireless communication between the UE 105 and one or more of the gNBs 110, which may provide wireless communications access to the 5G CN 140 on behalf of the UE 105 using 5G NR. The wireless interface between base stations (gNBs 110 and/or ng-eNB 114) and the UE 105 may be referred to as a Uu interface 139. 5G NR radio access may also be referred to as NR radio access or as 5G radio access. In FIG. 1, the serving gNB for UE 105 is assumed to be gNB 110-1, although other gNBs (e.g., gNB 110-2) may act as a serving gNB if UE 105 moves to another location or may act as a secondary gNB to provide additional throughput and bandwidth to UE 105.

Base stations in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g., directly or indirectly via other gNBs 110 and/or other ng-eNBs. An ng-eNB 114 may provide LTE wireless access and/or evolved LTE (eLTE) wireless access to UE 105. Some gNBs 110 (e.g., gNB 110-2) and/or ng-eNB 114 in FIG. 1 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114. Base stations 110, 114 may communicate directly with one another via an Xn communication interface. Additionally or alternatively, base stations 210, 214 may communicate directly or indirectly with other components of the 5G NR positioning system 100, such as the LMF 120 and AMF 115.

5G NR positioning system 100 may also include one or more WLANs 116 which may connect to a Non-3GPP InterWorking Function (N3IWF) 150 in the 5G CN 140 (e.g., in the case of an untrusted WLAN 116). For example, the WLAN 116 may support IEEE 802.11 Wi-Fi access for UE 105 and may comprise one or more Wi-Fi APs Here, the N3IWF 150 may connect to other elements in the 5G CN 140 such as AMF 115. In some embodiments, WLAN 116 may support another RAT such as Bluetooth. The N3IWF 150 may provide support for secure access by UE 105 to other elements in 5G CN 140 and/or may support interworking of one or more protocols used by WLAN 116 and UE 105 to one or more protocols used by other elements of 5G CN 140 such as AMF 115. For example, N3IWF 150 may support IPSec tunnel establishment with UE 105, termination of IKEv2/IPSec protocols with UE 105, termination of N2 and N3 interfaces to 5G CN 140 for control plane and user plane, respectively, relaying of uplink (UL) and downlink (DL) control plane Non-Access Stratum (NAS) signaling between UE 105 and AMF 115 across an N1 interface. In some other embodiments, WLAN 116 may connect directly to elements in 5G CN 140 (e.g. AMF 115 as shown by the dashed line in FIG. 1) and not via N3IWF 150. For example, direct connection of WLAN 116 to 5GCN 140 may occur if WLAN 116 is a trusted WLAN for 5GCN 240 and may be enabled using a Trusted WLAN Interworking Function (TWIF) (not shown in FIG. 1) which may be an element inside WLAN 116. It is noted that while only one WLAN 116 is shown in FIG. 1, some embodiments may include multiple WLANs 116.

Access nodes may comprise any of a variety of network entities enabling communication between the UE 105 and the AMF 115. This can include gNBs 110, ng-eNB 114, WLAN 116, and/or other types of cellular base stations. However, access nodes providing the functionality described herein may additionally or alternatively include entities enabling communications to any of a variety of RATs not illustrated in FIG. 1, which may include non-cellular technologies. Thus, the term "access node," as used in the embodiments described herein below, may include but is not necessarily limited to a gNB 110, ng-eNB 114 or WLAN 116.

As will be discussed in greater detail below, in some embodiments, an access node, such as a gNB 110, ng-eNB 114, or WLAN 116 (alone or in combination with other components of the 5G NR positioning system 100), may be configured to, in response to receiving a request for location information from the LMF 120, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 1 depicts access nodes 110, 114, and 116 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 135 and the EPC corresponds to 5GCN 140 in FIG. 1. The methods and techniques described herein for obtaining a civic location for UE 105 may be applicable to such other networks.

The gNBs 110 and ng-eNB 114 can communicate with an AMF 115, which, for positioning functionality, communicates with an LMF 120. The AMF 115 may support mobility of the UE 105, including cell change and handover of UE 105 from an access node 110, 114, or 116 of a first RAT to an access node 110, 114, or 116 of a second RAT. The AMF 115 may also participate in supporting a signaling connection to the UE 105 and possibly data and voice bearers for the UE 105. The LMF 120 may support positioning of the UE 105 using a CP location solution when UE 105 accesses the NG-RAN 135 or WLAN 116 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 120 may also process location service requests for the UE 105, e.g., received from the AMF 115 or from the GMLC 125. The LMF 120 may be connected to AMF 115 and/or to GMLC 125. In some embodiments, a network such as 5GCN 140 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 110, ng-eNB 114 and/or WLAN 116, and/or using assistance data provided to the UE 105, e.g., by LMF 120).

The Gateway Mobile Location Center (GMLC) 125 may support a location request for the UE 105 received from an external client 130 and may forward such a location request to the AMF 115 for forwarding by the AMF 115 to the LMF 120. A location response from the LMF 120 (e.g., containing a location estimate for the UE 105) may be similarly returned to the GMLC 125 either directly or via the AMF 115, and the GMLC 125 may then return the location response (e.g., containing the location estimate) to the external client 130.

A Network Exposure Function (NEF) 145 may be included in 5GCN 140. The NEF 145 may support secure exposure of capabilities and events concerning 5GCN 140 and UE 105 to the external client 130, which may then be referred to as an Access Function (AF) and may enable secure provision of information from external client 130 to 5GCN 140. NEF 145 may be connected to AMF 115 and/or to GMLC 125 for the purposes of obtaining a location (e.g. a civic location) of UE 105 and providing the location to external client 130.

As further illustrated in FIG. 1, the LMF 120 may communicate with the gNBs 110 and/or with the ng-eNB 114 using an NR Positioning Protocol annex (NRPPa) as defined in 3GPP Technical Specification (TS) 38.445. NRPPa messages may be transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP) as defined in 3GPP TS 37.355. Here, LPP messages may be transferred between the UE 105 and the LMF 120 via the AMF 115 and a serving gNB 110-1 or serving ng-eNB 114 for UE 105. For example, LPP messages may be transferred between the LMF 120 and the AMF 115 using messages for service-based operations (e.g., based on the Hypertext Transfer Protocol (HTTP)) and may be transferred between the AMF 115 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 120 to obtain location related information from gNBs 110 and/or ng-eNB 114, such as parameters defining DL-PRS transmission from gNBs 110 and/or ng-eNB 114.

In the case of UE 105 access to WLAN 116, LMF 120 may use NRPPa and/or LPP to obtain a location of UE 105 in a similar manner to that just described for UE 105 access to a gNB 110 or ng-eNB 114. Thus, NRPPa messages may be transferred between a WLAN 116 and the LMF 120, via the AMF 115 and N3IWF 150 to support network-based positioning of UE 105 and/or transfer of other location information from WLAN 116 to LMF 120. Alternatively, NRPPa messages may be transferred between N3IWF 150 and the LMF 120, via the AMF 115, to support network-based positioning of UE 105 based on location related information and/or location measurements known to or accessible to N3IWF 150 and transferred from N3IWF 150 to LMF 120 using NRPPa. Similarly, LPP and/or LPP messages may be transferred between the UE 105 and the LMF 120 via the AMF 115, N3IWF 150, and serving WLAN 116 for UE 105 to support UE assisted or UE based positioning of UE 105 by LMF 120.

In a 5G NR positioning system 100, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 130, LMF 120, or other device or service within the 5G network, the positioning method may be categorized as being UE assisted (or "network-based").

With a UE-assisted position method, UE 105 may obtain location measurements and send the measurements to a location server (e.g., LMF 120) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 110, ng-eNB 114, and/or one or more access points for WLAN 116. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 120, an SLP, or broadcast by gNBs 110, ng-eNB 114, or WLAN 116).

With a network based position method, one or more base stations (e.g., gNBs 110 and/or ng-eNB 114), one or more APs (e.g., in WLAN 116), or N3IWF 150 may obtain location measurements (e.g., measurements of RSSI, RTT, RSRP, RSRQ, AoA, or TOA) for signals transmitted by UE 105, and/or may receive measurements obtained by UE 105 or by an AP in WLAN 116 in the case of N3IWF 150, and may send the measurements to a location server (e.g., LMF 120) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 2:
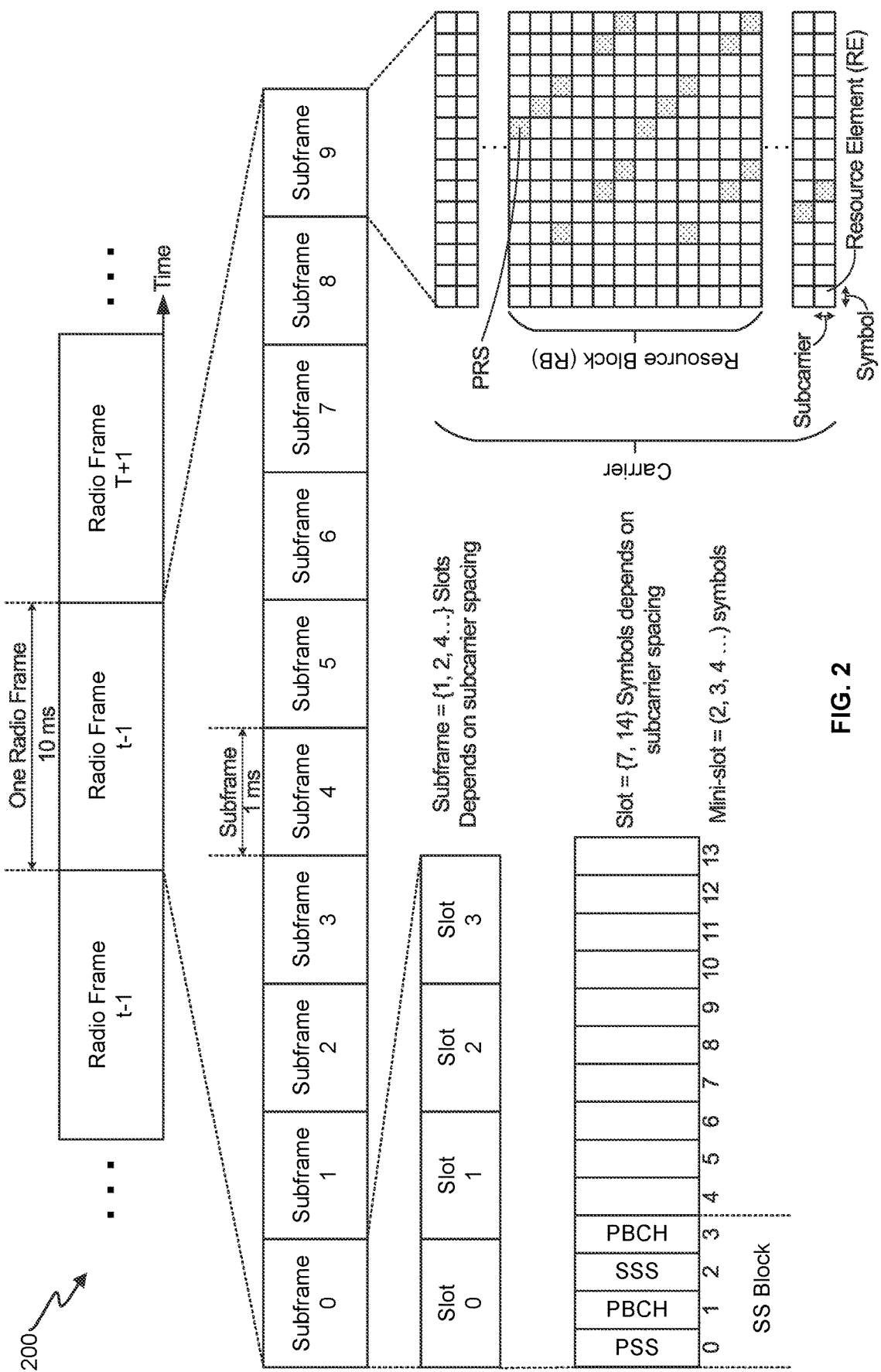
FIG. 2 illustrates an example of a frame structure usable by a communication system, in accordance with at least one embodiment.

FIG. 2 illustrates an example of a frame structure 200 usable by a communication system, such as the communication system 100, in accordance with at least one embodiment. The frame structure 200 can serve as the basis for physical layer communication between the UE 105 and serving gNB 110-1. The transmission timeline for each of the downlink and uplink may be partitioned into units of radio frames. Each radio frame may have a predetermined duration (e.g., ten milliseconds (ms)) and may be partitioned into ten subframes, each of one ms, with indices of "0" through "9." Each subframe may include a variable number of slots depending on the subcarrier spacing. Each slot may include a variable number of symbol periods (e.g., seven or fourteen symbols) depending on the subcarrier spacing. The symbol periods in each slot may be assigned indices. A mini-slot may comprise a sub slot structure (e.g., two, three, or four symbols). Additionally shown in FIG. 2 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning fourteen symbols and twelve subcarriers. Each RE is represented in FIG. 2 with a square. Dotted squares represent PRS REs (e.g., REs allocated for PRS). In the illustration of FIG. 2, the PRS allocation follows a diagonal pattern, where the symbols for PRS are arranged diagonally and are six subcarriers apart in the frequency domain.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols "0-3" as shown in FIG. 2. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

For a given frequency, the serving gNB 110-1 may configure the UE 105 by performing, among other things, Time Domain Division (TDD) resource designation using different layers to perform different functions. An "upper layer" or "higher layer" may comprise a layer of the serving base station 110-1 providing control information to the UE 105 via Radio Resource Control (RRC) protocol (e.g., an RRC layer). A higher layer may additionally include an application layer, Media Access Control (MAC) layer, or other layer capable of providing the UE 105 with information regarding designated resources for communications. Furthermore, the physical layer (or "lower layer") has a scheduler that can provide Downlink Control Information (DCI) information (e.g., transport format, resource allocation, etc.) to the UE 105 via the Physical Downlink Control Channel (PDCCH). The serving gNB 110-1 can, using RRC signaling, perform semi-static designation of time domain resource elements to implement cell-specific and/or UE-specific patterns. The physical layer, the serving gNB 110-1 can (using DCI in the PDCCH) perform a dynamic designation of time domain resources on a per-slot basis (e.g., having much finer granularity than RRC signaling) using a Slot Format Indicator (SFI) in the DCI.

The Physical Uplink Control Channel (PUCCH) is used to communicate Uplink Control Information (UCI) from the UE to the serving gNB 110-1. This UCI may comprise, for example, a Hybrid Automatic Repeat Request (HARQ) (e.g., a HARQ Acknowledgement (HARQ-ACK)), Channel State Information (CSI), and Scheduling Request (SR). In NR, PUCCH may be flexible in its time and frequency allocation, allowing for differently-capable UEs (e.g., UEs with smaller bandwidth capabilities) efficient usage of available resources. For NR, PUCCH resources can come in five different formats, including short formats (in which PUCCH resources span "1-2" symbols), and long formats (in which PUCCH resources can span "4-14" symbols).

Figure 3:
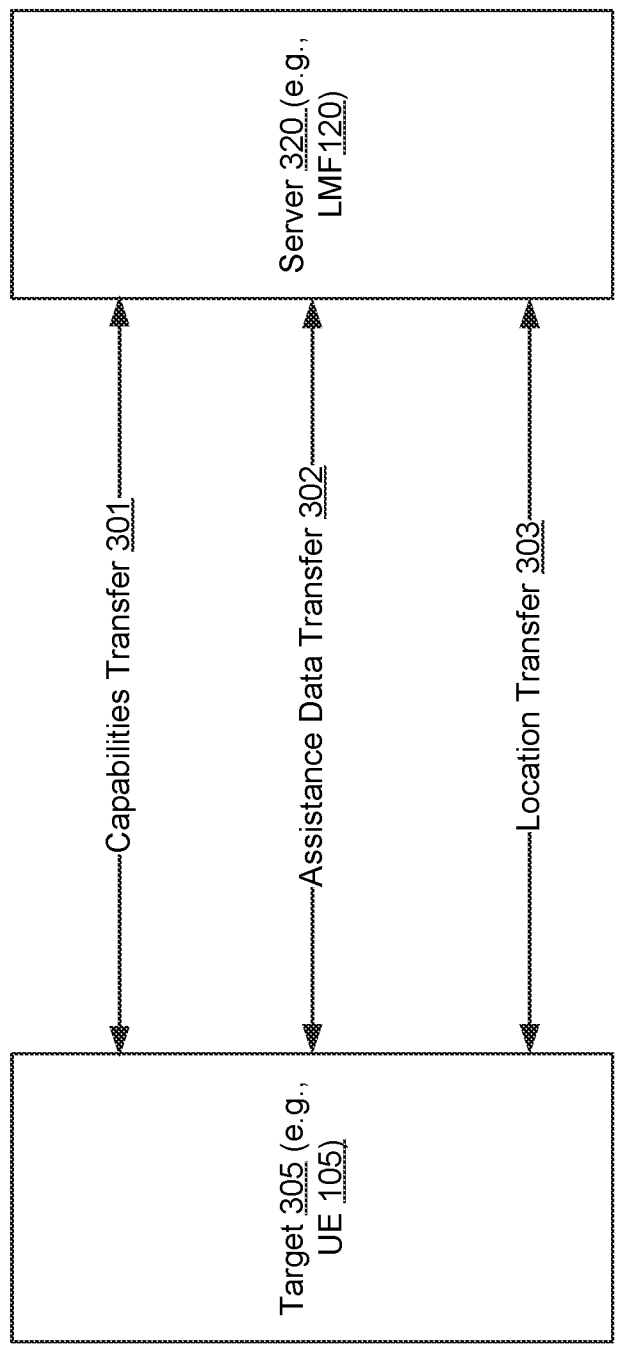
FIG. 3 illustrates an example of communications procedures in a positioning session, in accordance with at least one embodiment.

FIG. 3 is a call-flow diagram illustrating an example of communications procedures in a positioning session, in accordance with at least one embodiment. The positioning session is between a target 305 and a server 320. The target 305 can correspond to the UE 105. The server 320 can be a location server (e.g., LMF 120), where the location server can be a standalone component of a communication system (e.g., the communication system 100) or can be integrated with another component of the communication system (e.g., with a base station). The positioning session follows a particular protocol, such as the LPP protocol for an LPP session, and remains established to allow communications between the target 305 and the server 320 according to the particular protocol. The communications follow a set of procedures that are performed to determine a position of the target 305. Each procedure includes a set of transactions performable by any or a combination of the target 305 and the server 302.

As illustrated, at the start of the positioning session, the server 320 may not be aware of the capabilities of the target 305 to perform positioning measurements. Accordingly, a capability indication procedure is performed to send information about the capabilities to the server 320 (illustrated as a capabilities transfer 301). Further, assistance data may be sent from the server 320 to the target 305 (illustrated as an assistance data transfer 302), according to an assistance data procedure. The target 305 may rely on the assistance data to perform particular positioning measurements. Data related to the positioning measurements (e.g., the actual measurements or a position estimate derived therefrom) may be sent to the target 305 (illustrated as a location transfer 303) according to a location transfer procedure.

Figure 4:
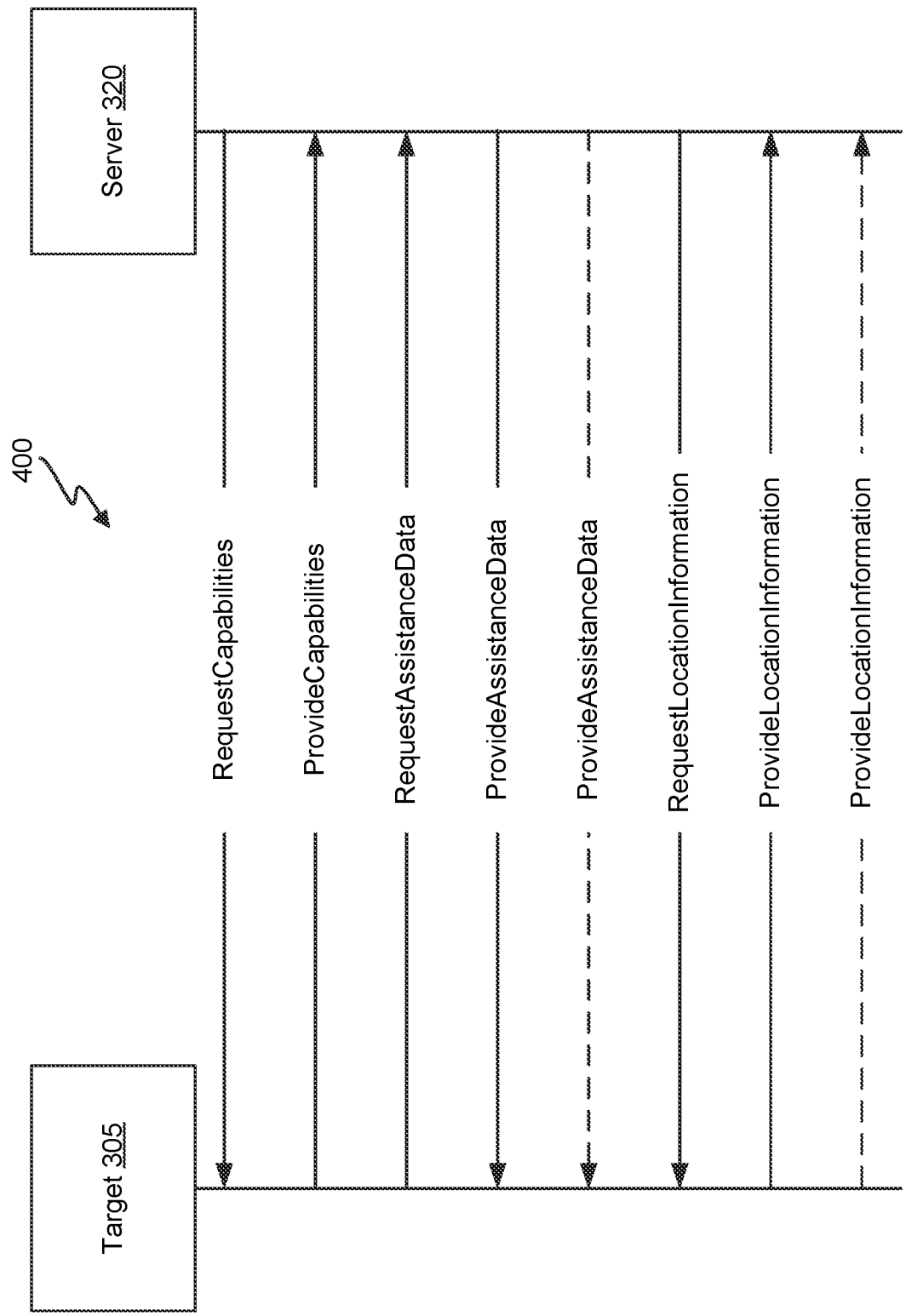
FIG. 4 illustrates an example of a sequence diagram in support of a positioning session, in accordance with at least one embodiment.

FIG. 4 illustrates an example of a call-flow diagram 400 of a method that may be performed in support of a positioning session, in accordance with at least one embodiment. The sequence diagram 400 is described in connection with PRS for DL RSTD measurements in an LPP session, as an example of the procedures of FIG. 3. Nonetheless, the sequence diagram 400 is similarly applicable to other signals, other measurements, and/or other types of positioning session.

Generally, the LPP session is used between the server 320 and the target 305 to obtain location related measurements or a location estimate or to transfer assistance data. A single LPP session can be used to support a single location request. Multiple LPP sessions can be used between the same endpoints to support multiple different location requests. Each LPP session includes one or more LPP transactions. And each LPP transaction performs a single operation capability transfer, assistance data transfer, or location information transfer).

The instigator of an LPP session typically instigates the first LPP transaction, but subsequent transactions may be instigated by either endpoints. LPP transactions within an LPP session may occur serially or in parallel. LPP transactions are indicated at the LPP protocol level with a transaction ID to associate messages with one another (e.g., request and response).

In the illustrative example of FIG. 4, the capabilities of the target 305 to support DL RSTD measurements may not be known to the server 320. Accordingly, the server 320 may instigate the LPP session. Capabilities in an LPP context refer to the ability of at least the target 305 to support different positioning methods defined for LPP, different aspects of a particular positioning method, and common features not specific to only one positioning method (e.g., capability to handle multiple LPP transactions). These capabilities are defined within the LPP protocol and transferred between the target 305 and the server 320 using LPP transport. Accordingly, the server 320 may send an LPP request capabilities message to the target 305 (shown as "RequestCapabilities"), where this message requests the LPP capabilities of the target 305. In turn, the target 305 may respond with an LPP provide capabilities message shown as "ProvideCapabilities"). The capabilities may refer to particular positioning methods (e.g., DL-TDOA) or may be common to multiple positioning methods and may include one or more parameters that indicate the capabilities. Examples of such parameters relate to, without limitation, the processing and buffering requirements of downlink PRS, such as the number of PRS resources per TRP, Fast Fourier Transform (FFT) size, and number of OFDM symbols with PRS per PRS resource. For instance, the parameters include any of the maximum number of frequency layers, the maximum number of TRPs per frequency layer, the maximum number of PRS resource sets per TRP per frequency layer, the maximum number of resources per SRS resource set, the maximum number of DL PRS resources that the target 305 can process in a lot, the maximum number of TRPs for all frequency layers, the maximum number of resources per frequency layer, and/or the duration of DL PRS symbol in units of milliseconds that the target 305 can process every "T" milliseconds assuming a maximum DL PRS bandwidth.

PRS configuration parameters, such as the number of consecutive positioning subframes, periodicity, muting pattern, etc., may be decided by the network and may be signaled to the target 305 by the server 320 as part of the OTDOA assistance data. OTDOA assistance data may also include reference cell information (PCI) and neighbor cell lists containing the PCI of neighbor cells and the PRS configuration parameters for the cells. The OTDOA assistance data may indicate set of PRS resources, PRS resource sets, and TPRs to be measured and may allow a UE to determine when a PRS positioning occasion occurs on signals received from various cells, and to determine the PRS sequence transmitted from various cells to measure a time of arrival. Such OTDOA assistance data can be requested by the target 305 from the server 320, whereby the target 305 sends an LPP assistance data request message to the server 320 (shown as "RequestAssistanceData"). In the LPP assistance data request message, the target 305 may indicate the particular type of assistance data that is requested. In turn, the server 320 can respond by sending an LPP provide assistance data message to the target 305 (shown as "ProvideAssistanceData"). The LPP provide assistance data message may include the various types of the assistance data or only the requested assistance data. Shown with a dashed arrow, the server 320 may transfer additional assistance data to the target in one or more additional LPP provide assistance data messages. The various request and provide messages are parts of assistance data procedures, whereby the procedures may enable the target 305 to request assistance data from the server 320 to assist in positioning, and enable the server 320 to transfer assistance data to the target 350 in the absence of a request. The transfer of the assistance data may be supported via unicast transport from the server 320 to target 305.

The term "location information" or "position information" applies both to an actual position estimate and to values used in computing position (e.g., radio measurements or positioning measurements). The target 305 sends such information to the server 320, where this transfer can be either in response to a request or unsolicited. In particular, the server 320 may send a request for location information to the target, such as in an LPP provide location information message (shown as "RequestLocationInformation"), and may indicate the type of location information needed and associated quality of service (QoS). In turn, the target 305 sends location information to the server 320 in an LPP provide location information message (shown as "ProvideLocationInformation"). The location information transferred typically matches the location information requested by the server 320. Optionally (e.g., if also requested by the server 320), the target 305 may send additional location information to the server 320 in one or more additional LPP messages, as shown with the dashed arrow. The various request and provide messages are parts of location transfer procedures, whereby the procedures may enable the server 320 to request location measurement data and/or a location estimate from the target 305, and to enable the target 305 to transfer location measurement data and/or a location estimate to the server 320 in the absence of a request.

Although the different transactions are shown in a particular order in the sequence diagram 400, a different order can be followed and/or some of the transactions can be skipped. Generally, LPP procedures need not occur in any fixed order, in order to provide greater flexibility in positioning. Thus, the target 305 may request assistance data at any time in order to comply with a previous request for location measurements from the server 320. The server 320 may instigate more than one request for location information in case location results from a previous request were not adequate for the requested QoS. And the target 305 may transfer capabilities information to the server at any time if not already performed.

Further, in certain situations, the server 320 (or another component of the network) can configure the target 305 to report the location information on a periodic basis. This configuration can be set with an information element (IE) indicating that periodic reporting is requested and including multiple fields. One of the fields, such as a "reportingAmount" field, indicates the number of periodic location information reports requested, including infinite/indefinite (until an LPP Abort message is received). Another one of the fields, such as a "reportingInterval" field, indicates the interval between location information reports and the response time requirement for the first location information report. Other ones of the fields relate to the response time for reporting the location information. In particular, a "time" field indicates the maximum response time as measured between receipt of the "RequestLocationInformation" and transmission of a "ProvideLocationInformation." A "responseTimeEarlyFix" indicates the maximum response time as measured between receipt of the "RequestLocationInformation" and transmission of a "ProvideLocationInformation" containing early location measurements or an early location estimate.

Figure 5:
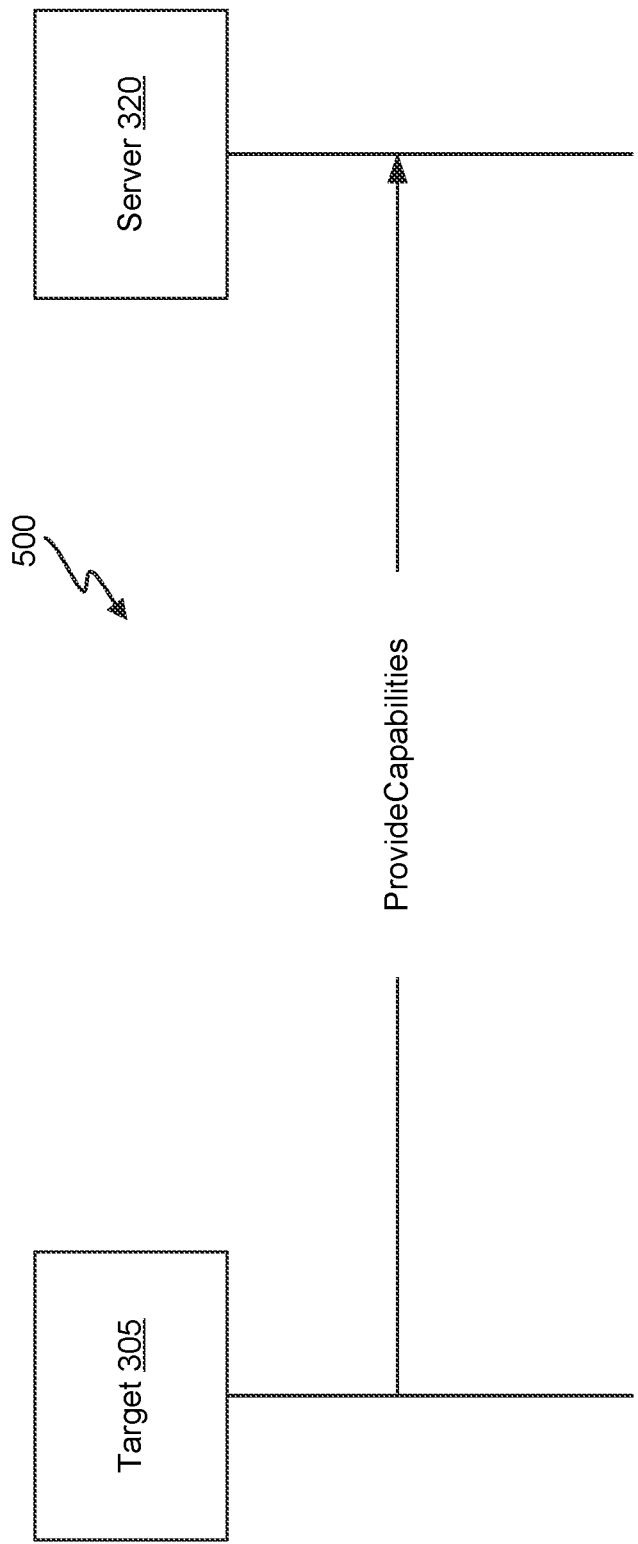
FIG. 5 illustrates an example of a transfer of unsolicited UE capabilities information, in accordance with at least one embodiment.

FIG. 5 illustrates an example of a transfer 500 of unsolicited UE capabilities information, in accordance with at least one embodiment. As illustrated, the target 305 may send information about its capabilities for PRS-based positioning measurement in an unsolicited manner to the server 320, per release 16 of the 3GPP specifications. In this case, the target 305 sends an LPP provide capabilities message (shown as "ProvideCapabilities") to the server 320 without or independent of an LPP request capabilities message from the server 320. Here, the LPP provide capability message typically includes an indication of the unsolicited nature of this message (e.g., by including an "endTransaction" IE set to TRUE).

Referring back to FIGS. 4 and 5, no mechanism exists in existing communication systems (including ones that are compliant with release 16 of the 3GPP specifications), where the target 305 may indicate to the server 320 that its capabilities for positioning measurements have changed and for the server 320 to acknowledge the changes, even when unsolicited UE capabilities information is transferred. In such systems, subsequent positioning measurements may not be adapted to the changed capabilities of the target 305. In contrast, embodiments of the present disclosure provide these mechanisms such that the positioning measurements can be dynamically adapted and refined based on the changed capabilities. Such mechanisms involve the target 305 indicating to the server 320 that its capabilities have changed during a positioning session (e.g., an LPP session) by sending an updated capabilities message or an error message indicating the change, and involve the server 320 acknowledging the changes by sending updated assistance data and/or updated location information requests as needed.

For example, after sending its capabilities information per a capability indication procedure of either FIG. 4 or FIG. 5, the target 305 may receive a request for location information (e.g., an LPP request location information message). However, the capabilities of the target 305 may have changed since the time when the capability indication procedure was performed. In this case, and before providing the location information (e.g., by sending an LPP provide location information message), the target 305 can send updated capabilities information to the server 320. The updated capabilities information can be sent in an LPP message having a similar format and similar fields as the LPP provide capabilities message of FIG. 4 or FIG. 5. This LPP message is referred to herein as an LPP provide updated capabilities message and includes, among other things, the set of parameters that have changed or the entire set of parameters, where the parameters indicate the capabilities of the target 305. Optionally, the LPP provide updated capabilities message includes a timer expiration that indicates a time after which the updated capabilities information becomes outdated. Additionally or alternatively, the LPP provide updated capabilities message may indicate capabilities of the target 305 varying for different durations of the LPP session.

In turn and during the positioning session (e.g., the LPP session), the server 320 may send a request for updated location information and/or a updated assistance data. The request may be an LPP request location information message, similar to the one described in connection with FIG. 4, except that the fields of this message may be set, as needed, based on the updated capabilities information indicated by the LPP provide updated capabilities message. Additionally, the LPP request location information message may have the same transaction identifier as the previously sent LPP request location information message. Further, even if the updated capabilities information does not necessitate a change to the fields relative to the ones of the previously sent LPP request location information message, the request may be still sent with the same fields as an acknowledgment of the LPP provide updated capabilities message. Similarly, the server 320 can send the updated assistance data in an LPP provide assistance data message, similar to the one described in connection with FIG. 4, except that the fields of this message may be set, as needed, based on the updated capabilities information. Here also, the LPP provide assistance data message may have the same transaction identifier as the previously sent LPP provide assistance data message. And even if the updated capabilities information does not necessitate a change to the fields relative to the ones of the previously sent LPP provide assistance data message, the updated assistance data may be still sent with the same fields as an acknowledgment of the LPP provide updated capabilities message. In an example, the server 320 may send the request for the updated location information and/or provide the updated assistance data to the target 305 before the target 305 is expected to send location information following the previously sent LPP request location information message.

As explained herein above, in certain situations, the target 305 is configured for periodic reporting of location information during a positioning session (e.g., an LPP session). In other words, the target 305 periodically sends an LPP provide location information message absent a corresponding LPP request location information message. During the positioning session, the target's 305 capabilities may also change. Upon a change, the target 305 may send updated capabilities information to the server 320 (e.g., in an LPP provide updated capabilities information message). Alternatively or additionally, the target 305 may periodically send updated capabilities information indicating the change (or lack thereof, as applicable).

Here also, upon sending updated capabilities information, the target 305 may receive a request for updated location information from the server 320 (e.g., an LPP request location information message). This request may have the same transaction identifier as the original request for location information that configured the periodic reporting. Additionally, only a subset of the fields between this request may be different compared to the original request. For example, the reporting interval may be updated, the response time or responseTimeEarlyFix may be updated, the request QoS parameters may be updated, or certain positioning methods may be switched ON or OFF. Additionally or alternatively, the server 320, for the same positioning session may provide updated assistance data to meet the updated capabilities of the target 305. Here, the updated assistance data may indicate a different set of PRS resources, PRS resource sets, and/or TRPs to be measured, among other indications.

In another example, rather than sending the updated capabilities information (e.g., in an LPP provide updated capabilities information message), the target 305 may report an error or warning message indicating that the capabilities that were previously reported are outdated and new capabilities should be reported. For instance, the error or warning message is sent in an IE for error LPP message type, such as a "CommonIEsError." The error or warning message may also indicate the positioning method(s) for which the new capabilities are available. In turn, the server 320 may send a new request for the capabilities (e.g., another LPP request capabilities information message) to which the target 305 responds with the updated capabilities information (e.g., another LPP provide capabilities information message, where this message includes the updated capabilities information).

As such, during a positioning session, the target 305 may initially report its capabilities information to the server 320 in a first capability indication procedure (e.g., one using an LPP request capabilities information message and an LPP provide capabilities information message). During the positioning session, the capabilities of the target 305 may change resulting in updated capabilities information. The target 305 may report its updated capabilities information to the server 320 during the same positioning session by using a second capability indication procedure (e.g., one using an LPP provide updated capabilities information message followed by an LPP request location information message and/or an LPP provide assistance data message, or one using an error or warning message followed by an LPP request capabilities information message).

In various embodiments herein, the target 305 sends capabilities information and updated capabilities information to the server 320 according to different capability indication procedures. Generally, the capabilities information includes parameters that relate to how positioning of the target 305 may be performed. One or more of the parameters may change. The updated capabilities information can include all the parameters (changed parameter(s) and unchanged parameter(s)) or only the changed parameter(s). Some of the parameters relate to PRS configurations, such as a maximum number of PRS resources, a maximum number of PRS resource sets, a maximum number of frequency layers, a maximum number of TRPs, etc. Other parameters relate to PRS measurements, such as support of Rx-Tx measurements or RSTD, or RSRP, number of measurements the UE can report, etc. Yet other parameters relate to positioning methods, such as support of multi-RTT, TDOA, AoD, method, support of simultaneous processing of methods, etc. In addition, some parameters relate to positioning procedures, such as support of receiving QCL reference from one TRP to another, type of QCL (Type-C or Type-D), etc. In the interest of clarity of explanation, the various embodiments may be described in connection with PRS measurements and the related parameters. Nonetheless, the embodiments similarly apply to the capabilities information and/or updated the capabilities information indicating parameters related to any or a combination of PRS measurements, PRS configurations, positioning methods, or positioning procedures.

FIGS. 6-9 illustrate examples of sequence diagrams that involve the second capability indication procedure. Like in FIG. 4, these sequence diagrams are described herein in connection with PRS for DL RSTD measurements in an LPP session, but similarly apply to other signals, other measurements, and/or other types of positioning session. In each of FIGS. 6-9, the first capability indication procedure has already been performed, whereby the target 305 has previously indicated its capabilities information to the server 320 and this previously reported capabilities information is outdated. A different variation of the second capability indication procedure is described in each of FIGS. 6-9 to indicate the updated capabilities information to the server 320.

Figure 6:
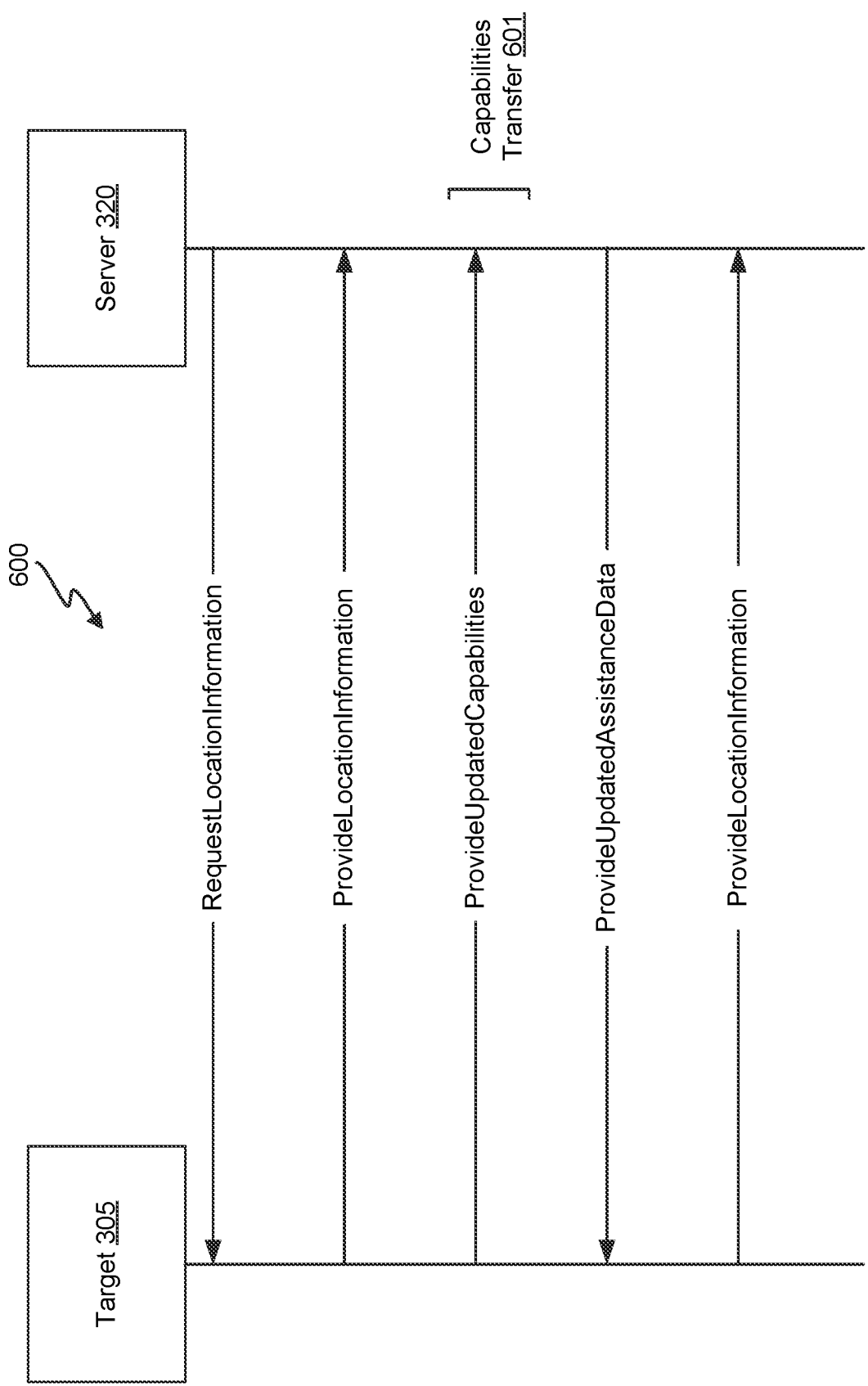
FIG. 6 illustrates an example of a sequence diagram to update UE capabilities information in support of a positioning session, in accordance with at least one embodiment.

FIG. 6 illustrates an example of a sequence diagram 600 to update UE capabilities information in support of a positioning session, in accordance with at least one embodiment. As illustrated, during the LPP session, the target 305 receives an LPP request location information message from the server 320 and responds with an LPP provide location information message to the server 320. The requested and provided location information are based on the previously indicated capabilities information. Next, the target 305 determines that its capabilities has changed and sends an LPP provide updated capabilities message to the server 320. This message includes updated capabilities information. The sending of this message corresponds to a capabilities transfer 601 performed according to the second capability indication procedure. In the sequence diagram 600 of FIG. 6, the server 320 responds with an LPP provide assistance data message, where the assistance data included in this message is updated assistance data and is based on the updated capabilities information. Subsequently, the target 305 sends an LPP provide location information message, where the location information included in this message is derived from or is actual positioning measurements that are performed based on the updated capabilities of the target 305 and on the updated assistance data.

Figure 7:
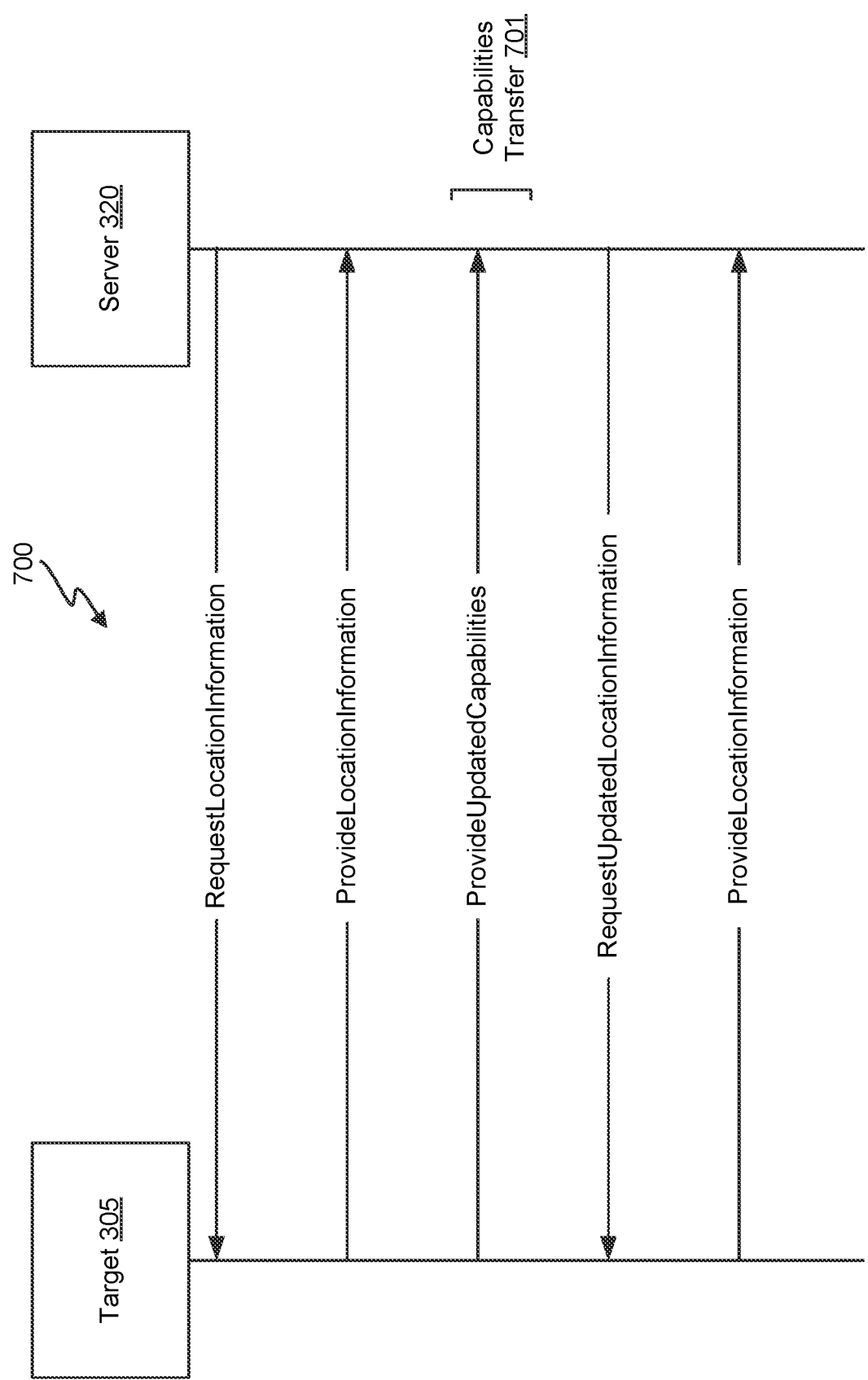
FIG. 7 illustrates another example of a sequence diagram to update UE capabilities information in support of a positioning session, in accordance with at least one embodiment.

FIG. 7 illustrates another example of a sequence diagram 700 to update UE capabilities information in support of a positioning session, in accordance with at least one embodiment. As illustrated, during the LPP session, the target 305 receives an LPP request location information message from the server 320 and responds with an LPP provide location information message to the server 320. The requested and provided location information are based on the previously indicated capabilities information. Next, the target 305 determines that its capabilities has changed and sends an LPP provide updated capabilities message to the server 320. This message includes updated capabilities information. The sending of this message corresponds to a capabilities transfer 701 performed according to the second capability indication procedure. In the sequence diagram 700 of FIG. 7, the server 320 responds with an LPP request location information message, where the fields of this message correspond to a request for updated location information and are based on the updated capabilities information. Subsequently, the target 305 sends an LPP provide location information message, where the location information included in this message is derived from or is actual positioning measurements that are performed based on the updated capabilities of the target 305 and on the request for the updated location information.

Figure 8:
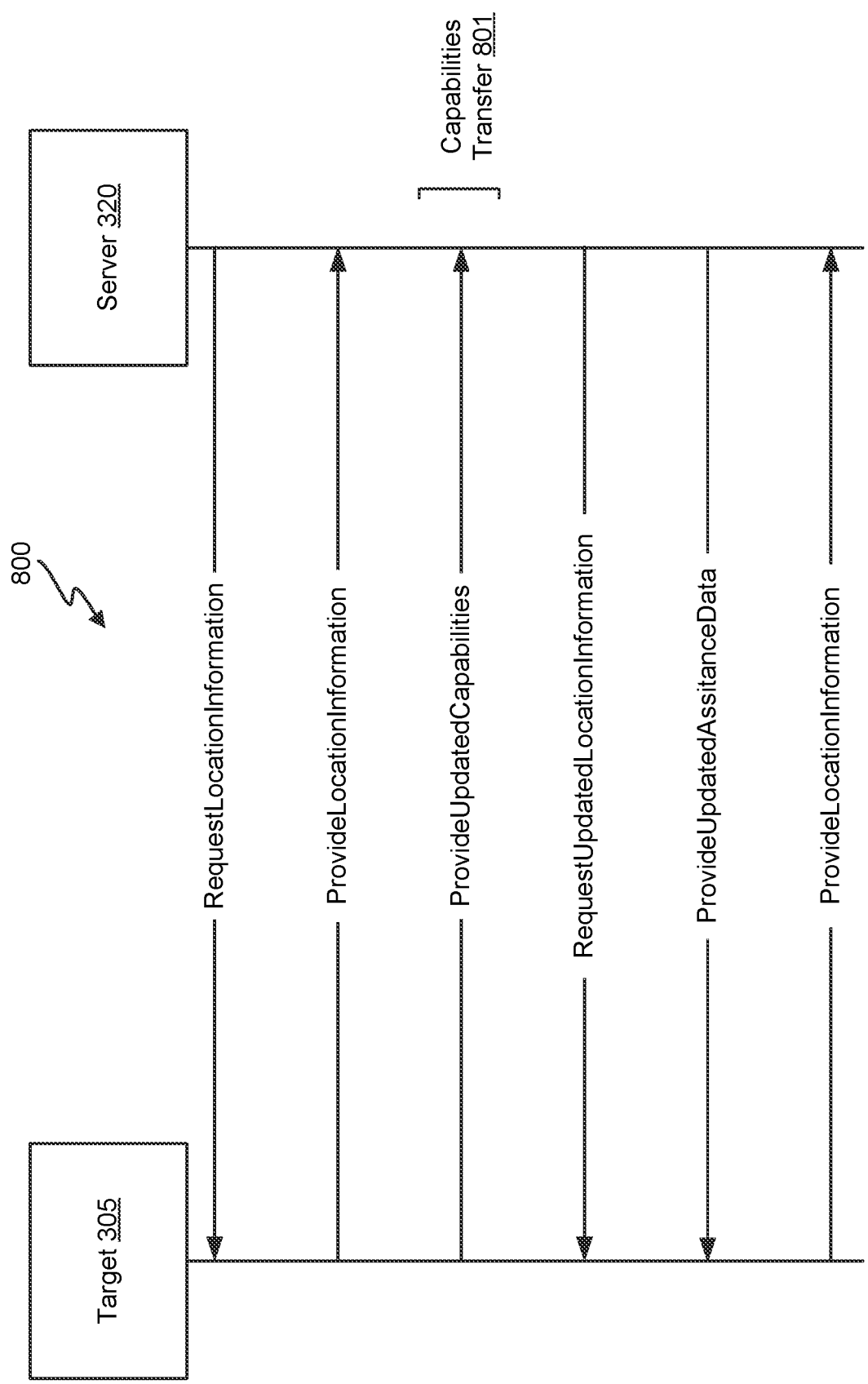
FIG. 8 illustrates a further example of a sequence diagram to update UE capabilities information in support of a positioning session, in accordance with at least one embodiment.

FIG. 8 illustrates a further example of a sequence diagram to update UE capabilities information in support of a positioning session, in accordance with at least one embodiment.

As illustrated, during the LPP session, the target 305 receives an LPP request location information message from the server 320 and responds with an LPP provide location information message to the server 320. The requested and provided location information are based on the previously indicated capabilities information. Next, the target 305 determines that its capabilities has changed and sends an LPP provide updated capabilities message to the server 320. This message includes updated capabilities information. The sending of this message corresponds to a capabilities transfer 801 performed according to the second capability indication procedure. In the sequence diagram 800 of FIG. 8, the server 320 responds with an LPP request location information message, where the fields of this message correspond to a request for updated location information and are based on the updated capabilities information. The server 320 also responds with an LPP provide assistance data message, where the assistance data included in this message is updated assistance data and is based on the updated capabilities information. Subsequently, the target 305 sends an LPP provide location information message, where the location information included in this message is derived from or is actual positioning measurements that are performed based on the updated capabilities of the target 305, on the updated assistance data, and on the request for the updated location information.

Figure 9:
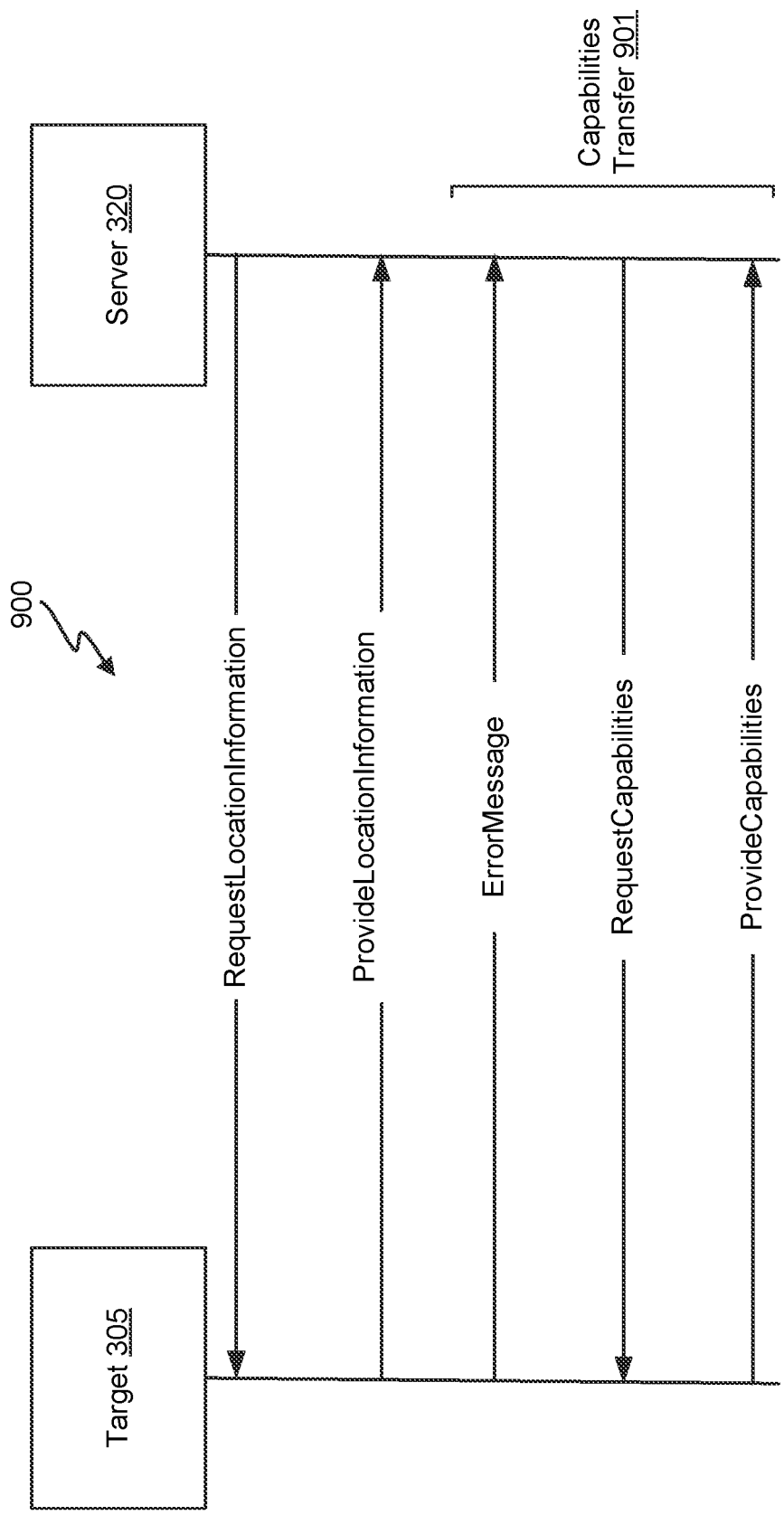
FIG. 9 illustrates yet another example of a sequence diagram to update UE capabilities information in support of a positioning session, in accordance with at least one embodiment.

FIG. 9 illustrates yet another example of a sequence diagram to update UE capabilities information in support of a positioning session, in accordance with at least one embodiment. As illustrated, during the LPP session, the target 305 receives an LPP request location information message from the server 320 and responds with an LPP provide location information message to the server 320. The requested and provided location information are based on the previously indicated capabilities information. Next, the target 305 determines that its capabilities have changed and sends an error or warning message to the server 320. The server 320 responds with an LPP request capabilities information message. In turn, the target 350 sends an LPP provide capabilities message, where this message includes the updated capabilities information. The sending of the error or warning message, the reception of the LPP request capabilities information message, and the sending of the LPP provide capabilities message correspond to a capabilities transfer 901 performed according to the second capability indication procedure. From that point on, the positioning measurements and reporting of the location information can progress in a similar manner as the one of the sequence diagram 400.

FIGS. 10-14 show illustrative flows related to determining location information of a target in a positioning session between the target and a server, in accordance with various embodiments. Some or all of the instructions for performing the operations of the illustrative flows can be implemented as hardware circuitry and/or stored as computer-readable instructions on a non-transitory computer-readable medium of the target (e.g., the target 305). Equivalent or corresponding operations may be also implemented as hardware circuitry and/or stored as computer-readable instructions on a non-transitory computer-readable medium of the server (e.g., the server 320). As implemented, the instructions represent modules that include circuitry or code executable by a processor(s) of the target or the server, as applicable. The use of such instructions configures the target or the server, as applicable, to perform the specific operations described herein. Each circuitry or code in combination with the processor represents a means for performing a respective operation(s). For instance, means for performing the functionality at each operation of the target shown in FIGS. 10-15 may comprise software and/or hardware components of the target, such as the bus 1605, processing unit(s) 1610, DSP 1620, wireless communication interface 1630, memory 1660, and/or other components of the UE 1600 illustrated in FIG. 16 and described in more detail below. While the operations are illustrated in a particular order, it should be understood that no particular order is necessary and that one or more operations may be omitted, skipped, performed in parallel, and/or reordered.

Furthermore, the flows of FIGS. 10-14 are described herein in connection with PRS for DL RSTD measurements in an LPP session. However, the operations of the flow similarly apply to other signals, other measurements, and/or other types of positioning session. In FIGS. 10-14, the LPP session is ongoing and capabilities information of the target are initially reported before any change thereto. In the interest of clarity of explanation, this capabilities information is referred to as initial capabilities information. Subsequent to this reporting, the capabilities change resulting in updated capabilities information. Also in the interest of clarity of explanation, upon the change thereto, the capabilities information is referred to as updated capabilities information.

Figure 10:
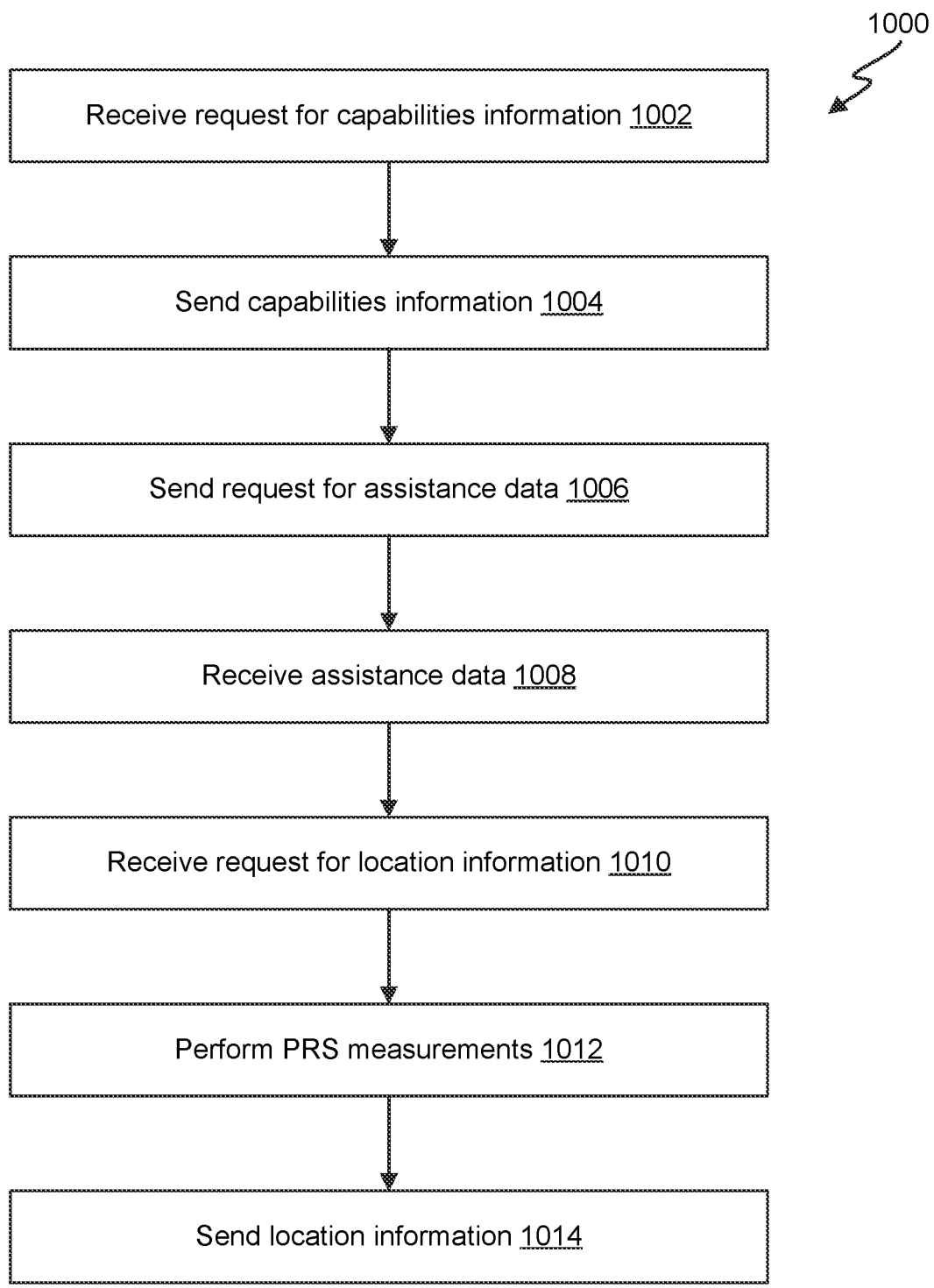
FIG. 10 illustrates an example of a flow for UE positioning, in accordance with at least one embodiment.

FIG. 10 illustrates an example of a flow 1000 for UE positioning, in accordance with at least one embodiment. Here, the UE positioning includes sending, during the LPP session, location information to the server. In FIG. 10, positioning measurements are performed based on the initial capabilities information only. In comparison, the flows of FIGS. 11-14 further describe the use of the updated capabilities information.

The flow 1000 includes operation 1002, where the target receives a request for capabilities information from the server during the LPP session. For example, the server may be the instigator of the LPP session and may send an LPP request capabilities information message that the target receives.

The flow 1000 includes operation 1004, where the target sends capabilities information during the LPP session. For example, the target sends an LPP provide capabilities information message to the server, where this message includes the initial capabilities information (e.g., parameters indicating the initial/current capabilities of the target).

The flow 1000 includes operation 1006, where the target sends a request for assistance data during the LPP session. For example, the target sends an LPP request assistance data message to the server.

The flow 1000 includes operation 1008, where the target receives assistance data during the LPP session. For example, the server may respond with an LPP provide assistance data message that the target receives, where this message includes the assistance data.

The flow 1000 includes operation 1010, where the target receives a request for location information during the LPP session. For example, the server may send an LPP request location information message that the target receives.

The flow 1000 includes operation 1012, where the target performs PRS measurements during the LPP session. For example, the target determines parameters for the measurements from the assistance data (e.g., the cells to measure on, the PRS timing, etc.), determines the types of and particular measurements to perform (e.g., DL-TDOA, periodic or non-periodic, etc.) and performs the requested measurements given the parameters.

The flow 1000 includes operation 1014, where the target sends location information during the LPP session. For example, the target sends an LPP provide location information message to the server, where this message includes the location information (e.g., the PRS measurements and/or a derived location fix from such measurements).

Figure 11:
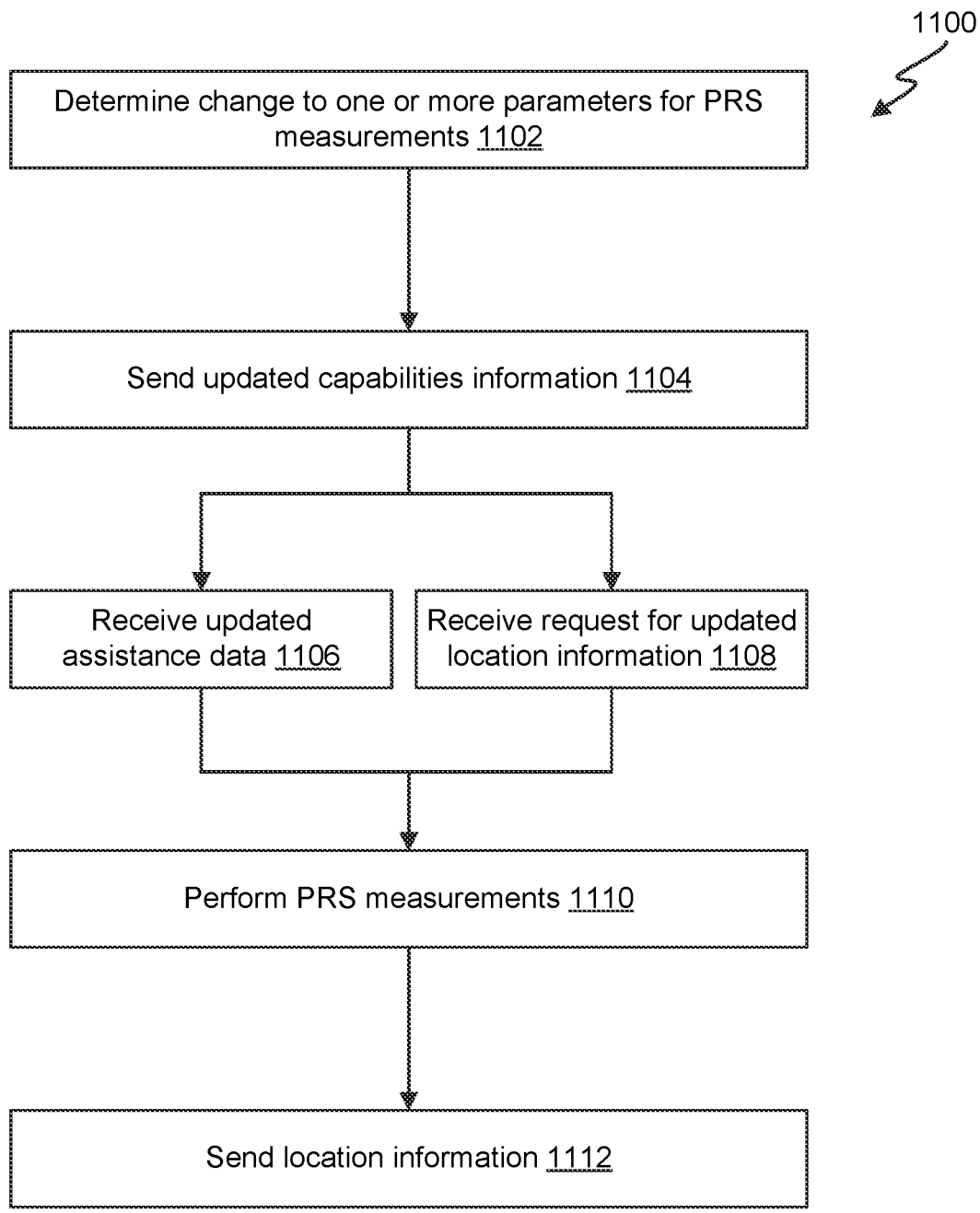
FIG. 11 illustrates an example of a flow for UE positioning based on updated capabilities information in a positioning session, in accordance with at least one embodiment.

FIG. 11 illustrates an example of a flow 1100 for UE positioning based on updated capabilities information in the positioning session, in accordance with at least one embodiment. Here, during the ongoing LPP session (that started with the flow 1000 of FIG. 10), the capabilities of the target change. The target reports the resulting updated capabilities information and the server acknowledges this update by responding with updated assistance data and/or updated request for location information.

The flow 1100 includes operation 1102, where the target determines a change to one or more parameters for PRS measurements during the LPP session. For example, the parameters include any or a combination of the maximum number of frequency layers, the maximum number of TRPs per frequency layer, the maximum number of PRS resource sets per TRP per frequency layer, the maximum number of resources per SRS resource set, the maximum number of DL PRS resources that the target can process in a lot, the maximum number of TRPs for all frequency layers, the maximum number of resources per frequency layer, and/or the duration of DL PRS symbol in units of milliseconds that the target can process every "T" milliseconds assuming a maximum DL PRS bandwidth. For different reasons (e.g., user traffic data, power consumption, signal strengths, etc.), some of these parameters may change, resulting in updated capabilities of the target.

The flow 1100 includes operation 1104, where the target sends updated capabilities information during the LPP session. For example, the target sends an LPP provide updated capabilities information message to the server, where this message includes the various parameters or only the parameters that have changed. Optionally, the LPP provide updated capabilities information message can include a timer expiation that indicates a time after which the updated capabilities information becomes outdated and/or an indication of how the capabilities of the target vary for different durations of the LPP session.

The flow 1100 includes operation 1106, where the target receives updated assistance data during the LPP session. For example, the server sends an LPP provide assistance data message that the target receives. This message includes updated assistance data that the server derives based on the updated capabilities information. This message can also include the same transaction identifier as the LPP provide assistance data message of operation 1008. Even if the assistance data need not change given the updated capabilities information, the server may still send the LPP provide assistance data message at operation 1106 as an acknowledgment of the updated capabilities information.

The flow 1100 includes operation 1108, where the target receives a request for updated location information during the LPP session. For example, the server sends an LPP request location information message that the target receives. This message indicates the types of and particular PRS measurements that the target is to subsequently perform, as determined by the server based on the updated capabilities information. This message can also include the same transaction identifier as the LPP request location information message of operation 1010. Even if the PRS measurements parameters need not change given the updated capabilities information, the server may still send the LPP request location information message at operation 1108 as an acknowledgment of the updated capabilities information.

The flow 1100 includes operation 1110, where the target performs PRS measurements during the LPP session. For example, the target determines the parameters for the measurements from the updated assistance data (if received; if not received, the target uses the previously sent assistance data) and determines the types of measurements and particular measurements (if the updated location request is received; if not received, the target uses the fields previously reported in the LPP request location information message of operation 1010) and performs the requested measurements given the parameters.

The flow 1100 includes operation 1112, where the target sends location information during the LPP session. For example, the target sends an LPP provide location information message to the server, where this message includes the location information (e.g., the PRS measurements and/or a derived location fix from such measurements).

Figure 12:
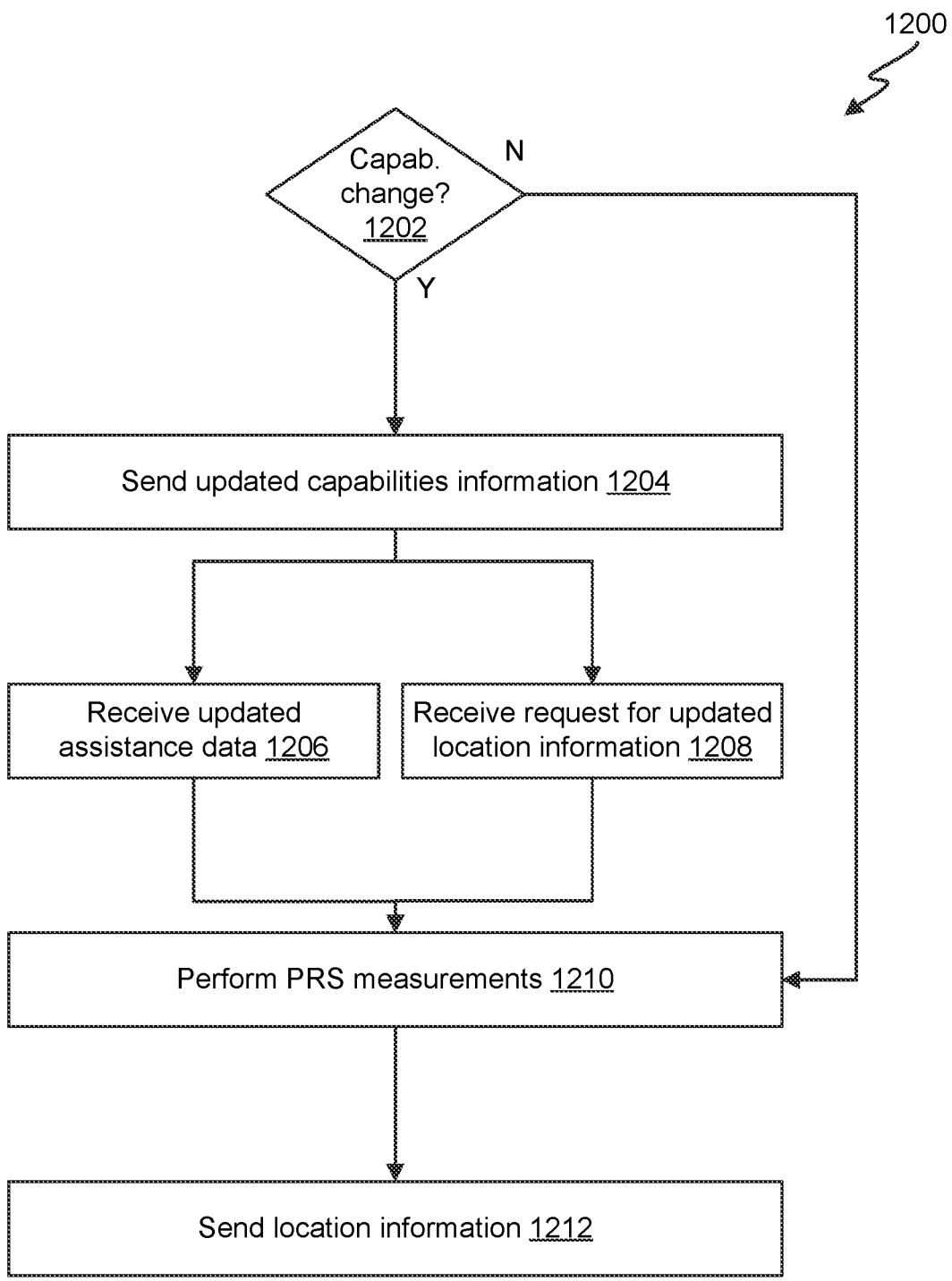
FIG. 12 illustrates another example of a flow for UE positioning based on updated capabilities information, in accordance with at least one embodiment.

FIG. 12 illustrates another example of a flow 1200 for UE positioning based on updated capabilities information, in accordance with at least one embodiment. Here, the flow 1200 applies to periodic reporting of location information. In particular, at operation 1010 of FIG. 10, the server may have indicated the periodic reporting in its LPP request location. Accordingly, the flow 1200 may have been performed to indicate and use the updated capabilities information during the periodic reporting.

The flow 1200 includes operation 1202, where the target determines whether a change to one or more parameters for the PRS measurements have changed during the LPP session. This determination may be similar to operation 1102 of FIG. 11. Additionally or alternatively, the target performs this determination on a periodic basis as a check of whether or not the target's capabilities have changed. If the capabilities have not changed, operation 1210 can follow operation 1202, where the target continues its periodic positioning measurements in support of the periodic reporting of the location information. Otherwise, operation 1204 follows operation 1202.

The flow 1200 includes operation 1204, where the target sends updated capabilities information during the LPP session. For example, the target sends an LPP provide updated capabilities information message to the server, where this message includes the various parameters or only the parameters that have changed.

The flow 1200 includes operation 1206, where the target receives updated assistance data during the LPP session. For example, the server sends an LPP provide assistance data message that the target receives. This message includes updated assistance data that the server derives based on the updated capabilities information. The updated assistance data can indicate a different set of PRS resources, PRS resource sets, or TRPs to be measured. This message can also include the same transaction identifier as the LPP provide assistance data message of operation 1008. Even if the assistance data need not change given the updated capabilities information, the server may still send the LPP provide assistance data message at operation 1106 as an acknowledgment of the updated capabilities information.

The flow 1200 includes operation 1208, where the target receives a request for updated location information during the LPP session. For example, the server sends an LPP request location information message that the target receives. This message can include the same transaction identifier as the LPP request location information message of operation 1010. In addition, this message can change only a subset of the fields relative to the fields of the request location information message of operation 1010. The updatable fields include, for instance, the reporting interval, the response time or responseTimeEarlyFix, the QoS parameters, and/or switching ON/OFF some of the positioning methods. Even if the PRS measurements parameters need not change given the updated capabilities information, the server may still send the LPP request location information message at operation 1208 as an acknowledgment of the updated capabilities information.

The flow 1200 includes operation 1210, where the target performs PRS measurements during the LPP session. For example, the target determines the parameters for the measurements from the updated assistance data (if received; if not received, the target uses the previously sent assistance data) and determines the types of measurements and particular measurements (if the updated location request is received; if not received, the target uses the fields previously reported in the LPP request location information message of operation 1010) and performs the requested measurements given the parameters.

The flow 1200 includes operation 1212, where the target sends location information during the LPP session. For example, the target sends an LPP provide location information message to the server, where this message includes the location information (e.g., the PRS measurements and/or a derived location fix from such measurements).

Figure 13:
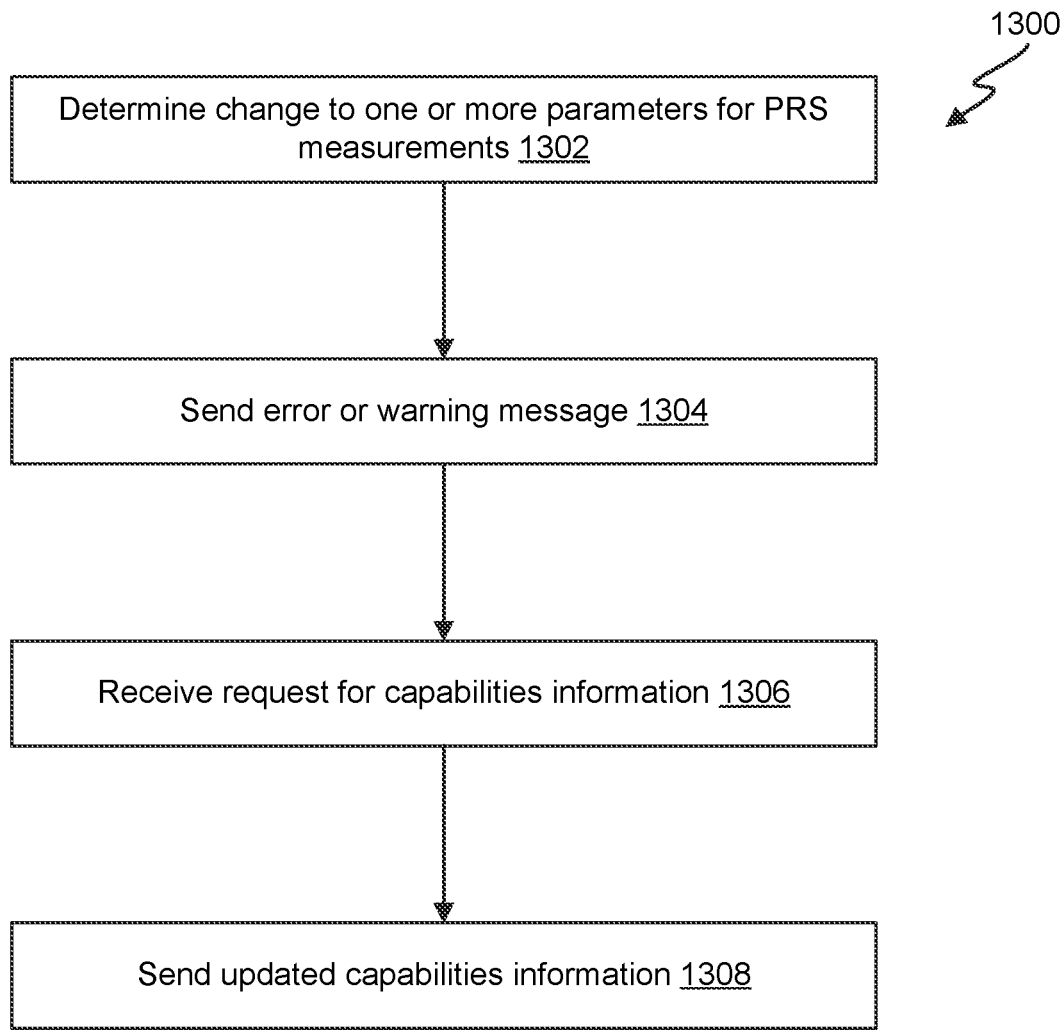
FIG. 13 illustrates an example of a flow for sending updated capabilities information in a positioning session, in accordance with at least one embodiment.

FIG. 13 illustrates an example of a flow 1300 for sending updated capabilities information in a positioning session, in accordance with at least one embodiment. Here, rather than reporting updated capabilities information, the target indicates to the server that its capabilities have changed by sending to the server an error or warning message. Based on this message, the server can request and receive the updated capabilities information from the target.

The flow 1300 includes operation 1302, where the target determines a change to one or more parameters for PRS measurements during the LPP session. This determination may be similar to operation 1102 of FIG. 11 and operation 1202 of FIG. 12 and, as applicable, may be performed periodically in the case of periodic location information reporting.

The flow 1300 includes operation 1304, where the target sends an error or warning message during the LPP session. For example, the error or warning message is sent in an IE for error LPP message type, such as a CommonIEsError and indicates that the capabilities that were previously reported are outdated and/or new capabilities are available and can be reported. For instance. The error or warning message may also indicate the positioning method(s) for which the new capabilities are available.

The flow 1300 includes operation 1306, where the target receives a request for capabilities information during the LPP session. For example, this operation is similar to operation 1002 of FIG. 10, except that the server may send the corresponding LPP request capabilities information message in response to the error or warning message.

The flow 1300 includes operation 1308, where the target sends updated capabilities information during the LPP session. For example, this operation is similar to operation 1004 of FIG. 10, except that the target may send, to the server, its updated capabilities information in the corresponding LPP provide capabilities information message. Following operation 1308, the server may send, and the target may receive assistance data that may be updated based on the updated capabilities and the device may perform PRS measurements and send location information to the server similar to operations 1106-1112 of FIG. 11 and operations 1206-1212 of FIG. 12.

Figure 14:
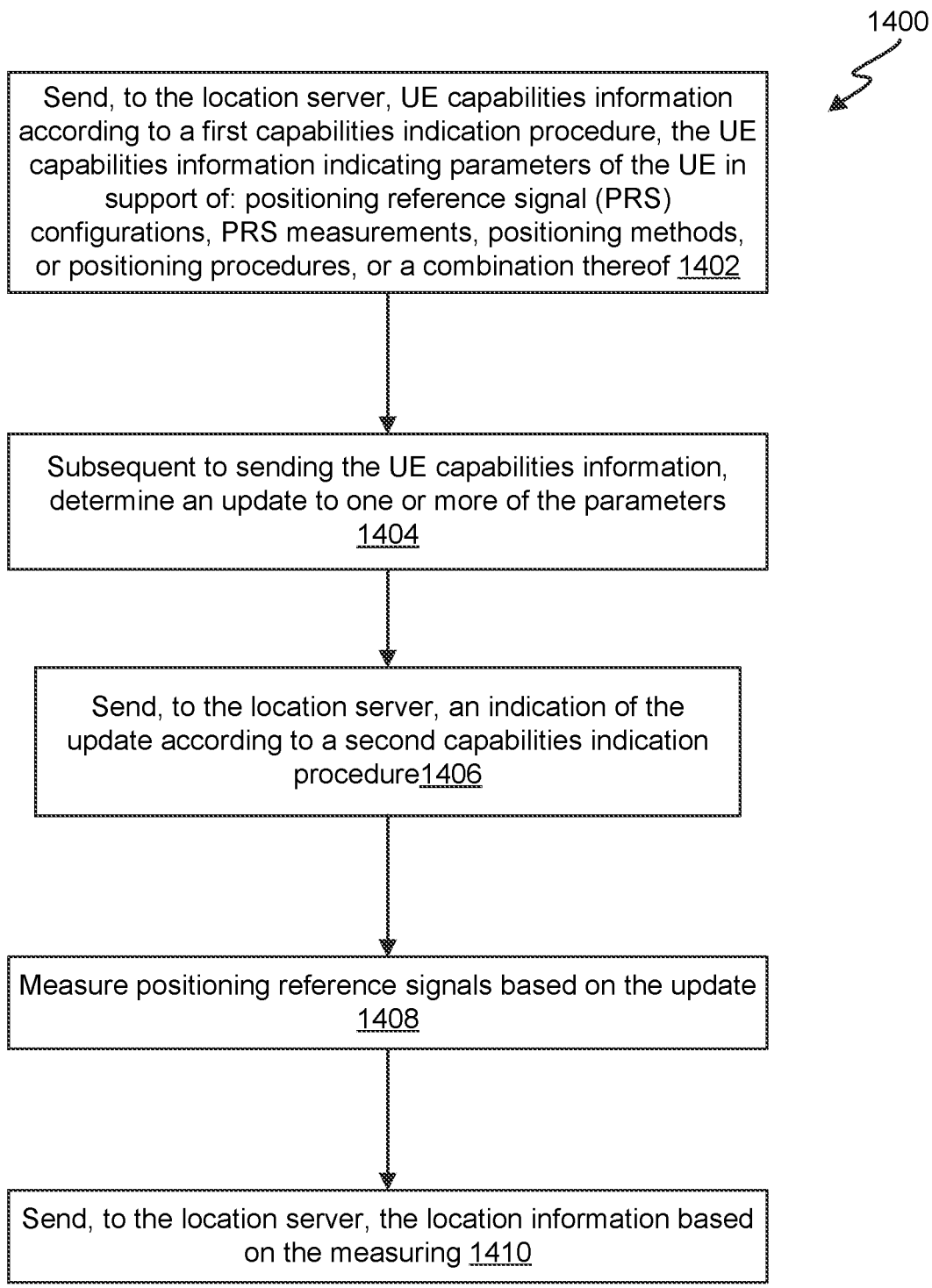
FIG. 14 illustrates an example of a flow for UE positioning based on updated capabilities information, in accordance with at least one embodiment.

FIG. 14 illustrates an example of a flow 1400 for UE positioning based on updated capabilities information, in accordance with at least one embodiment. The flow 1400 corresponds to a method of sending location information of a UE (e.g., a target, such as the target 305), where the method implemented by the UE in association with a positioning session (e.g., an LPP session) between the UE and a location server (e.g., a server, such as the server 320).

The flow 1400 includes operation 1402, where the UE sends, to the location server, UE capabilities information according to a first capability indication procedure. The UE capabilities information indicates parameters of the UE in support of: positioning reference signal (PRS) configurations (e.g., a maximum number of PRS resources, a maximum number of PRS resource sets, a maximum number of frequency layers, a maximum number of TRPs, etc.), PRS measurements (e.g., support of Rx-Tx measurements or RSTD, or RSRP, number of measurements the UE can report, etc.), positioning methods (e.g., support of multi-RTT, TDOA, AoD, method, support of simultaneous processing of methods, etc.), or positioning procedures (e.g., support of receiving QCL reference from one TRP to another, type of QCL (Type-C or Type-D), etc.), or a combination thereof. In an example, the first capability indication procedure may include receiving a request from the location server for the UE capabilities information (e.g., receiving an LPP request capabilities information message) and sending they response to the request, wherein the response comprises a UE capabilities information and the transaction identifier the capabilities information. According to some embodiments, this may comprise sending an LPP provide capabilities information message, similar to operations 1002-1004 of FIG. 10. According to some embodiments, the second capability indication procedure comprises sending, to the location server, (i) updated UE capabilities information that comprises the update, or (ii) the updated UE capabilities information and a parameter indicating an applicability of the updated UE capabilities information to the positioning session Means for performing the functionality at operation 1402 may comprise software and/or hardware components of the UE, such as the bus 1605, processing unit(s) 1610, DSP 1620, wireless communication interface 1630, memory 1660, and/or other components of the UE 1600 illustrated in FIG. 16 and described in more detail below.

The flow 1400 includes operation 1404, where, subsequent to sending the UE capabilities information, the UE determines an update to one or more of the parameters. For instance, during the positioning session, the UE determines that one or more of the parameters have changed, where this determination may be similar to operation 1102 of FIG. 11 and operation 1202 of FIG. 12 and, as applicable, may be performed periodically in the case of periodic location information reporting.

Means for performing the functionality at operation 1404 may comprise software and/or hardware components of the UE, such as the bus 1605, processing unit(s) 1610, DSP 1620, wireless communication interface 1630, memory 1660, and/or other components of the UE 1600 illustrated in FIG. 16 and described in more detail below.

The flow 1400 includes operation 1406, where the UE sends, to the location server, an indication of the update according to a second capability indication procedure. For example, during the positioning session, the UE sends updated capabilities information to the server (e.g., sending an LPP provide updated capabilities information message), similar to operation 1104 of FIG. 11 or 1204 of FIG. 12. In this example, the second capability indication procedure is different from the first capability indication procedure and includes sending the updated capabilities information to the server. In another example, the UE sends an error message to the server, similar to operation 1304 of FIG. 13, where this error or warning message includes the indication. The server may then send a new request for capabilities information of the UE, to which the UE may respond with its updated capabilities information. In this example also, the second capability indication procedure is different from the first capability indication procedure and includes sending the error message to the server.

In an example, the first capability indication procedure includes receiving a request of the location server for the UE capabilities information, where the request includes a transaction identifier; and sending a response to the request, where the response includes the UE capabilities information and the transaction identifier. In this example, the second capability indication procedure includes sending, to the location server, at least one of: (i) updated UE capabilities information that comprises the update, or (ii) the updated UE capabilities information and a parameter indicating an applicability of the updated capabilities information to the positioning session. The parameter includes a timer expiration before which the updated capabilities information is valid. Or, the parameter includes a duration that is within the position session and during which the updated capabilities information is valid.

In an example, the first capability indication procedure includes sending the UE capabilities information in response to a request of the location server for the UE capabilities information, and the second capability indication procedure comprises sending from the UE to the location server, without a request of the location server for updated UE capabilities information, the UE capabilities information that comprises the update. In this example, UE can further receive, from the location server, assistance data in response to the UE capabilities information sent according to the first capability indication procedure, receive, from the location server, updated assistance data in response to the updated UE capabilities information sent according to the second capability indication procedure, and perform the measuring based on the updated assistance data. Additionally or alternatively in this example, the UE can receive, from the location server, a location request based on the UE capabilities information sent according to the first capability indication procedure, receive, from the location server, an updated location request in response to the updated UE capabilities information sent according to the second capability indication procedure, and perform the measuring based on the updated location request.

In an example, The UE can further receive, from the location server, a location request for periodic location information reporting. In this example, the second capability indication procedure includes determining, on a periodic basis, one or more changes to the UE capabilities information; and sending, to the location server, updated UE capabilities information including the one or more changes. Further, the location request includes a transaction identifier, and the UE also receives, from the location server, an updated location request based on the updated UE capabilities information sent according to the second capability indication procedure, where the updated location request includes the transaction identifier. The location request also includes a set of fields for the PRS measurements, and the UE further receives, from the location server, an updated location request based on the updated UE capabilities information sent according to the second capability indication procedure, where the updated location request includes a subset of the set, where the subset includes fields that have changed. The fields of the subset includes at least one of: a reporting interval, a response time, a requested quality of service (QoS) parameter, an activation of a first positioning method, or a deactivation of a second positioning method.

In an example, the UE further receives, from the location server, assistance data in response to the UE capabilities information sent according to the first capability indication procedure, where the assistance data is associated with a transaction identifier; receives, from the location server, updated assistance data in response to updated UE capabilities information sent according to the second capability indication procedure, where the assistance data is associated with the transaction identifier; and performs the PRS measurements based on the updated assistance data. In this example, at least one: (i) a PRS resource, (ii) a PRS resource set, or (iii) a TRP to be measured is different between the assistance data and the updated assistance data.

In an example, the first capability indication procedure includes sending the UE capabilities information in response to a request of the location server for the UE capabilities information. In this example, the second capability indication procedure includes sending, to the location server, an error message indicating that a previously reported capability is outdated. The error message can further indicate a positioning method for which updated UE capabilities information that includes the update is available.

Means for performing the functionality at operation 1406 may comprise software and/or hardware components of the UE, such as the bus 1605, processing unit(s) 1610, DSP 1620, wireless communication interface 1630, memory 1660, and/or other components of the UE 1600 illustrated in FIG. 16 and described in more detail below.

The flow 1400 includes operation 1408, where the UE measures positioning reference signals based on the update based on the update. For example, the UE may receive, during the positioning session, updated assistance data and/or a request for updated location information from the server, where the server may send the updated assistance data and/or the request for the updated location information based on the updated capabilities information that were reported by the UE. Accordingly, the UE performs the PRS measurements in a similar manner to operations 1110 of FIG. 11 and 1210 of FIG. 12.

Means for performing the functionality at operation 1408 may comprise software and/or hardware components of the UE, such as the bus 1605, processing unit(s) 1610, DSP 1620, wireless communication interface 1630, memory 1660, and/or other components of the UE 1600 illustrated in FIG. 16 and described in more detail below.

The flow 1400 includes operation 1410, where the UE sends, to the location server, the location information based on the measuring. In an example, the location information includes the PRS measurements and/or a location fix derived by the UE at least in part from the PRS measurements. This operation may be similar to operations 1112 of FIG. 11 and 1212 of FIG. 12.

Means for performing the functionality at operation 1410 may comprise software and/or hardware components of the UE, such as the bus 1605, processing unit(s) 1610, DSP 1620, wireless communication interface 1630, memory 1660, and/or other components of the UE 1600 illustrated in FIG. 16 and described in more detail below.

Figure 15:
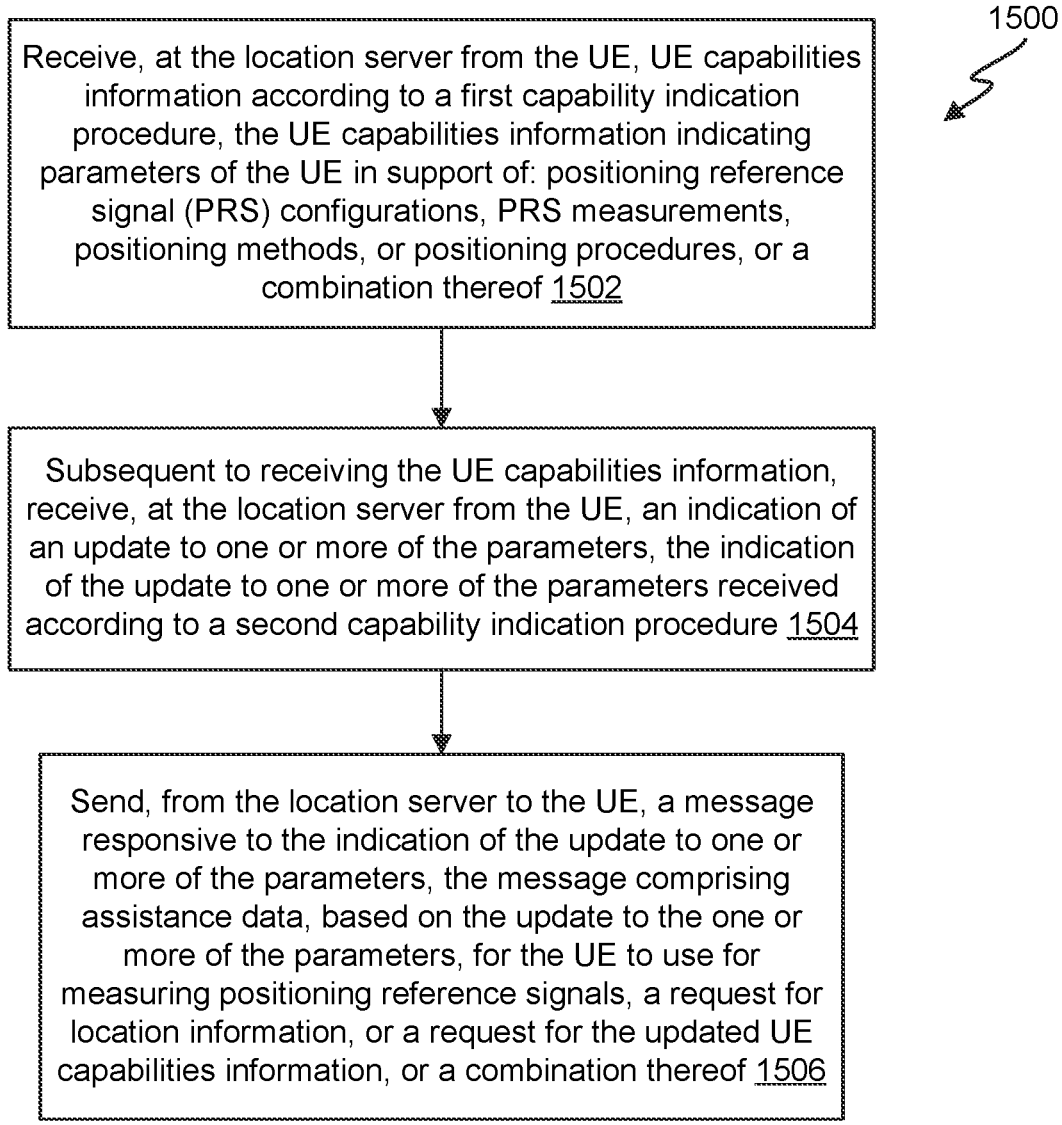
FIG. 15 illustrates an example of a flow for of enabling updated UE capabilities information in association with a positioning session between a UE and a location server, in accordance with at least one embodiment.

FIG. 15 illustrates an example of a flow 1500 for of enabling updated user equipment (UE) capabilities information in association with a positioning session between a UE and a location server, in accordance with at least one embodiment. The flow 1500 corresponds to a method of receiving location information of a UE (e.g., a target, such as the target 305), where the method is implemented by the location server in association with a positioning session (e.g., an LPP session) between the UE and the location server (e.g., a server, such as the server 320).

The flow 1500 includes operation 1502, where the location server receives, from the UE, UE capabilities information according to a first capability indication procedure, the UE capabilities information indicating parameters of the UE in support of: positioning reference signal (PRS) configurations, PRS measurements, positioning methods, or positioning procedures, or a combination thereof. Means for performing the operation at 1502 may comprise, for example, a bus 1605, one or more processing units 1610, a DSP 1620, a memory 1660, a wireless communication interface 1630, and/or other components of a system 1600, as described hereafter.

The flow 1500 includes at operation 1504, subsequent to receiving the UE capabilities information, receiving, at the location server from the UE, an indication of an update to one or more of the parameters, the indication of the update to one or more of the parameters received according to a second capability indication procedure. Means for performing the operation at 1502 may comprise, for example, a bus 1605, one or more processing units 1610, a DSP 1620, a memory 1660, a wireless communication interface 1630, and/or other components of a system 1600, as described hereafter.

The flow 1500 includes at operation 1504, sending, from the location server to the UE, a message responsive to the indication of the update to one or more of the parameters, the message comprising assistance data, based on the update to the one or more of the parameters, for the UE to use for measuring positioning reference signals, a request for location information, or a request for the updated UE capabilities information, or a combination thereof. Means for performing the operation at 1502 may comprise, for example, a bus 1605, one or more processing units 1610, a DSP 1620, a memory 1660, a wireless communication interface 1630, and/or other components of a system 1600, as described hereafter.

As previously noted, embodiments may include one or more additional functions, depending on desired functionality. These functions are described in the following embodiments.

According to some embodiments, the flow 1500 may further comprise receiving, at the location server from the UE, the location information, the location information indicative of measurements of positioning reference signals at the UE based on the update, and determining a location of the UE based on the location information. According to some embodiments, first capability indication procedure comprises sending a request for the UE capabilities information, wherein the request comprises a transaction identifier; and receiving a response to the request, wherein the response comprises the UE capabilities information and the transaction identifier; and the second capability indication procedure comprises receiving, at the location server, (i) the updated UE capabilities information comprising the update, or (ii) the updated UE capabilities information and a parameter indicating an applicability of the updated UE capabilities information to the positioning session. In such embodiments, the parameter may comprise a timer expiration before which the updated UE capabilities information is valid, or a duration that is within the position session and during which the updated UE capabilities information is valid.

According to some embodiments, the first capability indication procedure may comprise receiving the UE capabilities information from the UE in response to sending a request from the location server for the UE capabilities information, and the second capability indication procedure comprises receiving at the location server from the UE, without the request for the updated UE capabilities information, the UE capabilities information that comprises the update. In such embodiments, the flow 1500 may further comprising sending, from the location server, initial assistance data separate from the assistance data, in response to the UE capabilities information sent according to the first capability indication procedure; and wherein sending the message comprises sending the assistance data based on the update, the assistance data comprising updated assistance data.

According to some embodiments, the first capability indication procedure comprises receiving the UE capabilities information in response to a request by the location server for the UE capabilities information, wherein the second capability indication procedure comprises receiving, at the location server, an error message indicating that a previously reported capability is outdated.

Figure 16:
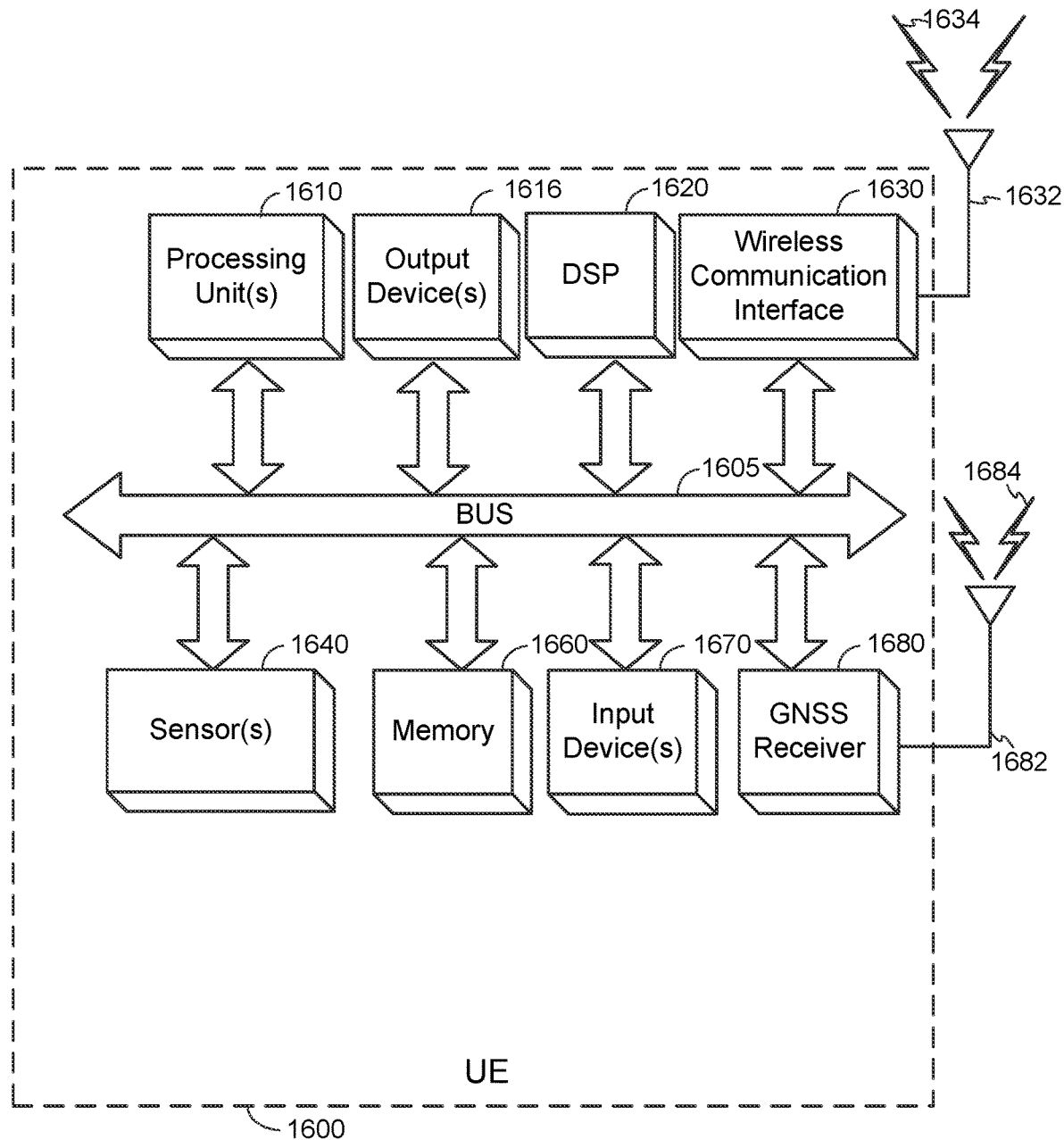
FIG. 16 is a block diagram of an embodiment of a UE, which can be utilized as described in the embodiments described herein and in association with FIGS. 1-15.

FIG. 16 is a block diagram of an embodiment of a UE, which can be utilized as described in the embodiments described herein and in association with FIGS. 1-14. The UE is an example of the target 302 described herein above. It should be noted that FIG. 16 is meant only to provide a generalized illustration of various components of UE 1600, any or all of which may be utilized as appropriate. In other words, because UEs can vary widely in functionality, they may include only a portion of the components shown in FIG. 16. It can be noted that, in some instances, components illustrated by FIG. 16 can be localized to a single physical device and/or distributed among various networked devices, which may be disposed at different physical locations.

The UE 1600 is shown comprising hardware elements that can be electrically coupled via a bus 1605 (or may otherwise be in communication, as appropriate). The hardware elements may include a processing unit(s) 1610 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 16, some embodiments may have a separate DSP 1620, depending on desired functionality. The UE 1600 also may comprise one or more input devices 1670, which may comprise without limitation one or more touch screens, touch pads, microphones, buttons, dials, switches, and/or the like; and one or more output devices 1615, which may comprise without limitation, one or more displays, light emitting diodes (LEDs), speakers, and/or the like.

The UE 1600 might also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the UE 1600 to communicate via the networks described herein with regard to FIGS. 1-13. The wireless communication interface 1630 may permit data to be communicated with a network, eNBs, ng-eNBs, gNBs, and/or other network components, computer systems, and/or any other electronic devices described herein. The communication can be carried out via one or more wireless communication antenna(s) 1632 that send and/or receive wireless signals 1634.

Depending on desired functionality, the wireless communication interface 1630 may comprise separate transceivers to communicate with base stations (e.g., eNBs, ng-eNBs and/or gNBs) and other terrestrial transceivers, such as wireless devices and access points. The UE 1600 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1600 can further include sensor(s) 1640. Such sensors may comprise, without limitation, one or more inertial sensors (e.g., accelerometer(s), gyroscope(s), and or other Inertial Measurement Units (IMUs)), camera(s), magnetometer(s), a compass, altimeter(s), microphone(s), proximity sensor(s), light sensor(s), barometer, and the like, some of which may be used to complement and/or facilitate the functionality described herein.

Embodiments of the UE 1600 may also include a GNSS receiver 1680 capable of receiving signals 1684 from one or more GNSS satellites (e.g., SVs 190) using an GNSS antenna 1682 (which may be combined in some implementations with antenna(s) 1632). Such positioning can be utilized to complement and/or incorporate the techniques described herein. The GNSS receiver 1680 can extract a position of the UE 1600, using conventional techniques, from GNSS SVs (e.g., SVs 190) of an GNSS system, such as Global Positioning System (GPS), Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 1680 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 1600 may further include and/or be in communication with a memory 1660. The memory 1660 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1660 of the UE 1600 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 1600 (e.g., using processing unit(s) 1610). In an aspect, then, such code and/or instructions can be used to configure and/or adapt a general purpose computer (or other device) to perform one or more operations in accordance with the described methods.

Figure 17:
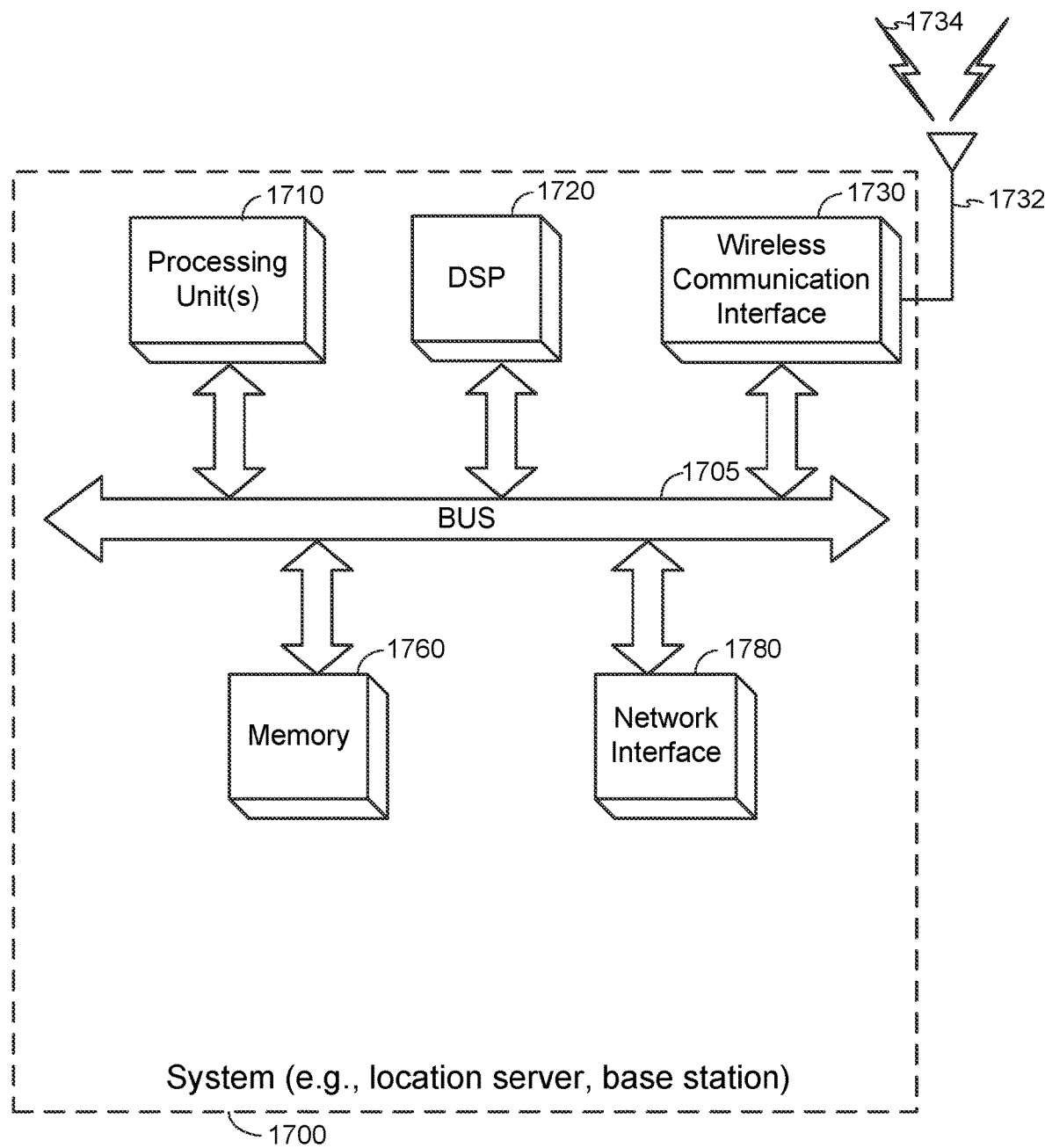
FIG. 17 illustrates an embodiment of a system, which can be utilized as described herein above (e.g., in association with FIGS. 1-15).

FIG. 17 illustrates an embodiment of a system 1700, which can be utilized as described herein above (e.g., in association with FIGS. 1-14). The components of the system 1700 are used to implement a location server, such as the server 320, where the location server may be a standalone component of a communication system or can be integrated with another component of the network system, such as with a base station. It should be noted that FIG. 17 is meant only to provide a generalized illustration of various components, any or all of which may be utilized as appropriate.

The system 1700 is shown comprising hardware elements that can be electrically coupled via a bus 1705 (or may otherwise be in communication, as appropriate). The hardware elements may include a processing unit(s) 1710 which can include without limitation one or more general-purpose processors, one or more special-purpose processors (such as DSP chips, graphics acceleration processors, ASICs, and/or the like), and/or other processing structure or means. As shown in FIG. 17, some embodiments may have a separate DSP 1720, depending on desired functionality. Location determination and/or other determinations based on wireless communication may be provided in the processing unit(s) 1710 and/or wireless communication interface 1730 (discussed below), according to some embodiments. The system 1700 also can include one or more input devices, which can include without limitation a keyboard, display, mouse, microphone, button(s), dial(s), switch(es), and/or the like;

and one or more output devices, which can include without limitation a display, light emitting diode (LED), speakers, and/or the like.

The system 1700 might also include a wireless communication interface 1730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the system 1700 to communicate as described herein. The wireless communication interface 1730 may permit data and signaling to be communicated (e.g., transmitted and received) UEs, base stations (e.g., eNBs, gNBs, and ng-eNBs), and/or other network components, computer systems, and/or any other electronic devices described herein. The communication can be carried out via one or more wireless communication antenna(s) 1732 that send and/or receive wireless signals 1734.

The system 1700 may also include a network interface 1780, which can include support of wireline communication technologies. The network interface 1780 may include a modem, network card, chipset, and/or the like. The network interface 1780 may include one or more input and/or output communication interfaces to permit data to be exchanged with a network, communication network servers, computer systems, and/or any other electronic devices described herein.

In many embodiments, the system 1700 will further comprise a memory 1760. The memory 1760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1760 of the system 1700 also can comprise software elements (not shown in FIG. 17), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1760 that are executable by the system 1700 (and/or processing unit(s) 1710 or DSP 1720 within system 1700). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of sending location information of a user equipment (UE) in association with a positioning session between the UE and a location server, the method comprising: sending, from the UE to the location server, UE capabilities information according to a first capability indication procedure, the UE capabilities information indicating parameters of the UE in support of: positioning reference signal (PRS) configurations, PRS measurements, positioning methods, or positioning procedures, or a combination thereof; subsequent to sending the UE capabilities information, determining, at the UE, an update to one or more of the parameters; sending, from the UE to the location server, an indication of the update according to a second capability indication procedure; measuring positioning reference signals at the UE based on the update; and sending, from the UE to the location server, the location information based on the measuring.

Clause 2. The method of clause 1, wherein: the first capability indication procedure comprises: receiving a request of the location server for the UE capabilities information, wherein the request comprises a transaction identifier; and sending a response to the request, wherein the response comprises the UE capabilities information and the transaction identifier; and the second capability indication procedure comprises: sending, to the location server, (i) updated UE capabilities information that comprises the update, or (ii) the updated UE capabilities information and a parameter indicating an applicability of the updated UE capabilities information to the positioning session.

Clause 3. The method of clause 2 wherein the parameter comprises: a timer expiration before which the updated UE capabilities information is valid, or a duration that is within the position session and during which the updated UE capabilities information is valid.

Clause 4. The method of clause 1 wherein the first capability indication procedure comprises sending the UE capabilities information in response to a request of the location server for the UE capabilities information, wherein the second capability indication procedure comprises sending from the UE to the location server, without a request of the location server for updated UE capabilities information, the UE capabilities information that comprises the update.

Clause 5. The method of clause 4 further comprising receiving, from the location server, assistance data in response to the UE capabilities information sent according to the first capability indication procedure; receiving, from the location server, updated assistance data in response to the updated UE capabilities information sent according to the second capability indication procedure; and performing the measuring of the positioning reference signals based on the updated assistance data.

Clause 6. The method of clause 4 further comprising receiving, from the location server, a location request based on the UE capabilities information sent according to the first capability indication procedure; receiving, from the location server, an updated location request in response to the updated UE capabilities information sent according to the second capability indication procedure; and performing the measuring of the positioning reference signals based on the updated location request.

Clause 7. The method clause 1 further comprising receiving, from the location server, a location request for periodic location information reporting, wherein the second capability indication procedure comprises: determining, on a periodic basis, one or more changes to the UE capabilities information; and sending, to the location server, updated UE capabilities information comprising the one or more changes.

Clause 8. The method of clause 7 wherein the location request comprises a transaction identifier, and further comprising: receiving, from the location server, an updated location request based on the updated UE capabilities information sent according to the second capability indication procedure, wherein the updated location request comprises the transaction identifier.

Clause 9. The method of clause 7 wherein the location request comprises a set of fields for the location information, and further comprising: receiving, from the location server, an updated location request based on the updated UE capabilities information sent according to the second capability indication procedure, wherein the updated location request comprises a subset of the set of fields, wherein the subset comprises fields that have changed.

Clause 10. The method of clause 9 wherein the fields of the subset comprise: a reporting interval, a response time, a requested quality of service (QoS) parameter, an activation of a first positioning method, or a deactivation of a second positioning method, or a combination thereof.

Clause 11. The method of clause 1 further comprising receiving, at the UE from the location server, assistance data in response to the UE capabilities information sent according to the first capability indication procedure, wherein the assistance data is associated with a transaction identifier; receiving, at the UE from the location server, updated assistance data in response to updated UE capabilities information sent according to the second capability indication procedure, wherein the assistance data is associated with the transaction identifier; and performing the PRS measurements based on the updated assistance data.

Clause 12. The method of clause 11 wherein at least one measurement is different between the assistance data and the updated assistance data, the at least one measurement comprising: a PRS resource, a PRS resource set, or a transmission and reception point (TRP), or a combination thereof.

Clause 13. The method of clause 1 wherein the first capability indication procedure comprises sending the UE capabilities information in response to a request of the location server for the UE capabilities information, wherein the second capability indication procedure comprises sending, to the location server, an error message indicating that a previously reported capability is outdated.

Clause 14. The method of clause 13 wherein the error message further indicates a positioning method for which updated UE capabilities information that comprises the update is available.

Clause 15. A method of enabling updated user equipment (UE) capabilities information in association with a positioning session between a UE and a location server, the method comprising: receiving, at the location server from the UE, UE capabilities information according to a first capability indication procedure, the UE capabilities information indicating parameters of the UE in support of: positioning reference signal (PRS) configurations, PRS measurements, positioning methods, or positioning procedures, or a combination thereof; subsequent to receiving the UE capabilities information, receiving, at the location server from the UE, an indication of an update to one or more of the parameters, the indication of the update to one or more of the parameters received according to a second capability indication procedure; and sending, from the location server to the UE, a message responsive to the indication of the update to one or more of the parameters, the message comprising: assistance data, based on the update to the one or more of the parameters, for the UE to use for measuring positioning reference signals, a request for location information, or a request for the updated UE capabilities information, or a combination thereof.

Clause 16. The method of clause 15, further comprising: receiving, at the location server from the UE, location information indicative of measurements of positioning reference signals at the UE based on the update; and determining a location of the UE based on the location information.

Clause 17. The method of any of clauses 15-16 wherein the first capability indication procedure comprises: sending a request for the UE capabilities information, wherein the request comprises a transaction identifier; and receiving a response to the request, wherein the response comprises the UE capabilities information and the transaction identifier; and the second capability indication procedure comprises: receiving, at the location server, (i) the updated UE capabilities information comprising the update, or (ii) the updated UE capabilities information and a parameter indicating an applicability of the updated UE capabilities information to the positioning session.

Clause 18. The method of clause 17 wherein the parameter comprises: a timer expiration before which the updated UE capabilities information is valid, or a duration that is within the position session and during which the updated UE capabilities information is valid.

Clause 19. The method of any of clauses 15-18 wherein the first capability indication procedure comprises receiving the UE capabilities information from the UE in response to sending a request from the location server for the UE capabilities information, wherein the second capability indication procedure comprises receiving at the location server from the UE, without the request for the updated UE capabilities information, the UE capabilities information that comprises the update.

Clause 20. The method of clause 19 further comprising sending, from the location server, initial assistance data separate from the assistance data, in response to the UE capabilities information sent according to the first capability indication procedure; and wherein sending the message comprises sending the assistance data based on the update, the assistance data comprising updated assistance data.

Clause 21. The method of clause 15 wherein the first capability indication procedure comprises receiving the UE capabilities information in response to a request by the location server for the UE capabilities information, wherein the second capability indication procedure comprises receiving, at the location server, an error message indicating that a previously reported capability is outdated.

Clause 22. A user equipment (UE) for sending location information in association with a positioning session between the UE and a location server, the UE comprising: a transceiver; a memory; and one or more processors communicatively coupled with the transceiver and the memory, wherein the one or more processors are configured to: send, via the transceiver to the location server, UE capabilities information according to a first capability indication procedure, the UE capabilities information indicating parameters of the UE in support of: positioning reference signal (PRS) configurations, PRS measurements, positioning methods, or positioning procedures, or a combination thereof; subsequent to sending the UE capabilities information, determining an update to one or more of the parameters; send, via the transceiver to the location server, an indication of the update to one or more of the parameters according to a second capability indication procedure; measure positioning reference signals at the UE based on the update; and send, via the transceiver to the location server, the location information based on the measuring.

Clause 23. The UE of clause 22, wherein: to send the UE capabilities information according to the first capability indication procedure, the one or more processors are configured to: receive a request of the location server for the UE capabilities information, wherein the request comprises a transaction identifier; and send a response to the request, wherein the response comprises the UE capabilities information and the transaction identifier; and to send the indication of the update to one or more of the parameters according to the second capability indication procedure, the one or more processors are configured to send, to the location server, (i) updated UE capabilities information that comprises the update, or (ii) the updated UE capabilities information and a parameter indicating an applicability of the updated UE capabilities information to the positioning session.

Clause 24. The UE of clause 22 wherein, to send the UE capabilities information according to the first capability indication procedure, the one or more processors are configured to send the UE capabilities information in response to a request of the location server for the UE capabilities information, and wherein, to send the indication of the update to one or more of the parameters according to the second capability indication procedure, the one or more processors are configured to send via the transceiver to the location server, without a request of the location server for the updated UE capabilities information, the UE capabilities information that comprises the update.

Clause 25. The UE clause 22 wherein the one or more processors are further configured to: receive, via the transceiver from the location server, a location request for periodic location information reporting, wherein the second capability indication procedure comprises:

determine, on a periodic basis, one or more changes to the UE capabilities information; and send, via the transceiver to the location server, updated UE capabilities information comprising the one or more changes.

Clause 26. The UE of clause 22 wherein the one or more processors are further configured to: receive, via the transceiver from the location server, assistance data in response to the UE capabilities information sent according to the first capability indication procedure, wherein the assistance data is associated with a transaction identifier; receive, via the transceiver from the location server, updated assistance data in response to updated UE capabilities information sent according to the second capability indication procedure, wherein the assistance data is associated with the transaction identifier; and perform the PRS measurements based on the updated assistance data.

Clause 27. A location server for enabling updated user equipment (UE) capabilities information in association with a positioning session between a UE and the location server, the location server comprising: a transceiver; a memory; and one or more processors communicatively coupled with the transceiver and the memory, wherein the one or more processors are configured to: receive, via the transceiver from the UE, UE capabilities information according to a first capability indication procedure, the UE capabilities information indicating parameters of the UE in support of: positioning reference signal (PRS) configurations, PRS measurements, positioning methods, or positioning procedures, or a combination thereof subsequent to receiving the UE capabilities information, receiving, at the location server from the UE, an indication of an update to one or more of the parameters, the indication of the update to one or more of the parameters received according to a second capability indication procedure; and send, via the transceiver to the UE, a message responsive to the indication of the update to one or more of the parameters, the message comprising: assistance data, based on the update to the one or more of the parameters, for the UE to use for measuring positioning reference signals, a request for location information, or a request for the updated UE capabilities information, or a combination thereof.

Clause 28. The location server of clause 27, wherein: to receive the UE capabilities information according to the first capability indication procedure, the one or more processors are configured to: send a request for the UE capabilities information, wherein the request comprises a transaction identifier; and receive a response to the request, wherein the response comprises the UE capabilities information and the transaction identifier; and to receive the indication of the update to one or more of the parameters according to the second capability indication procedure, the one or more processors are configured to receive, via the transceiver, (i) the updated UE capabilities information comprising the update, or (ii) the updated UE capabilities information and a parameter indicating an applicability of the updated UE capabilities information to the positioning session.

Clause 29. The location server of clause 27 wherein, to receive the UE capabilities information according to the first capability indication procedure, the one or more processors are configured to receive the UE capabilities information from the UE in response to sending a request from the location server for the UE capabilities information, and wherein to receive the indication of the update to one or more of the parameters according to the second capability indication procedure, the one or more processors are configured to receive, via the transceiver, without the request for the updated UE capabilities information, the UE capabilities information that comprises the update.

Clause 30. The location server of clause 27 wherein, to receive the UE capabilities information according to the first capability indication procedure, the one or more processors are configured to receive the UE capabilities information in response to a request by the location server for the UE capabilities information, wherein to receive the indication of the update to one or more of the parameters according to the second capability indication procedure, the one or more processors are configured to receive, via the transceiver, an error message indicating that a previously reported capability is outdated.

Clause 31. An apparatus having means for performing any of the methods of clauses 1-21.

Clause 32. A non-transitory computer-readable medium storing instructions comprising code for performing any of the methods of clauses 1-21.

What is claimed is:

1. A method of sending location information of a user equipment (UE) in association with a positioning session between the UE and a location server, the method comprising:
   sending, from the UE to the location server, UE capabilities information according to a first capability indication procedure, the UE capabilities information indicating parameters of the UE in support of: positioning reference signal (PRS) configurations, PRS measurements, positioning methods, or positioning procedures, or a combination thereof, wherein the first capability indication procedure comprises sending the UE capabilities information in response to a request of the location server for the UE capabilities information;
   subsequent to sending the UE capabilities information, determining, at the UE, an update to one or more of the parameters;
   sending, from the UE to the location server, an indication of the update according to a second capability indication procedure, wherein the second capability indication procedure comprises sending from the UE to the location server, without a request of the location server for updated UE capabilities information, the UE capabilities information that comprises the update;
   measuring positioning reference signals at the UE based on the update; and
   sending, from the UE to the location server, the location information based on the measuring.

2. The method of claim 1, wherein:
   the first capability indication procedure comprises:
      receiving a request of the location server for the UE capabilities information, wherein the request comprises a transaction identifier; and
      sending a response to the request, wherein the response comprises the UE capabilities information and the transaction identifier; and
   the second capability indication procedure comprises:
   sending, to the location server, (i) updated UE capabilities information that comprises the update, or (ii) the updated UE capabilities information and a parameter indicating an applicability of the updated UE capabilities information to the positioning session.

3. The method of claim 2, wherein the parameter comprises:
a timer expiration before which the updated UE capabilities information is valid, or
a duration that is within the position session and during which the updated UE capabilities information is valid.

4. The method of claim 1, further comprising:
receiving, from the location server, assistance data in response to the UE capabilities information sent according to the first capability indication procedure;
receiving, from the location server, updated assistance data in response to the updated UE capabilities information sent according to the second capability indication procedure; and
performing the measuring of the positioning reference signals based on the updated assistance data.

5. The method of claim 1, further comprising:
receiving, from the location server, a location request based on the UE capabilities information sent according to the first capability indication procedure;
receiving, from the location server, an updated location request in response to the updated UE capabilities information sent according to the second capability indication procedure; and
performing the measuring of the positioning reference signals based on the updated location request.

6. The method of claim 1, further comprising:
receiving, from the location server, a location request for periodic location information reporting, wherein the second capability indication procedure comprises:
determining, on a periodic basis, one or more changes to the UE capabilities information; and
sending, to the location server, updated UE capabilities information comprising the one or more changes.

7. The method of claim 6, wherein the location request comprises a transaction identifier, and further comprising:
receiving, from the location server, an updated location request based on the updated UE capabilities information sent according to the second capability indication procedure, wherein the updated location request comprises the transaction identifier.

8. The method of claim 6, wherein the location request comprises a set of fields for the location information, and further comprising:
receiving, from the location server, an updated location request based on the updated UE capabilities information sent according to the second capability indication procedure, wherein the updated location request comprises a subset of the set of fields, wherein the subset comprises fields that have changed.

9. The method of claim 8, wherein the fields of the subset comprise: a reporting interval, a response time, a requested quality of service (QOS) parameter, an activation of a first positioning method, or a deactivation of a second positioning method, or a combination thereof.

10. The method of claim 1, further comprising:
receiving, at the UE from the location server, assistance data in response to the UE capabilities information sent according to the first capability indication procedure, wherein the assistance data is associated with a transaction identifier;
receiving, at the UE from the location server, updated assistance data in response to updated UE capabilities information sent according to the second capability indication procedure, wherein the assistance data is associated with the transaction identifier; and
performing the PRS measurements based on the updated assistance data.

11. The method of claim 10, wherein at least one measurement is different between the assistance data and the updated assistance data, the at least one measurement comprising: a PRS resource, a PRS resource set, or a transmission and reception point (TRP), or a combination thereof.

12. The method of claim 1, wherein the first capability indication procedure comprises sending the UE capabilities information in response to a request of the location server for the UE capabilities information, wherein the second capability indication procedure comprises sending, to the location server, an error message indicating that a previously reported capability is outdated.

13. The method of claim 12, wherein the error message further indicates a positioning method for which updated UE capabilities information that comprises the update is available.

14. A method of enabling updated user equipment (UE) capabilities information in association with a positioning session between a UE and a location server, the method comprising:
receiving, at the location server from the UE, UE capabilities information according to a first capability indication procedure, the UE capabilities information indicating parameters of the UE in support of: positioning reference signal (PRS) configurations, PRS measurements, positioning methods, or positioning procedures, or a combination thereof, wherein the first capability indication procedure comprises:
sending a request for the UE capabilities information, wherein the request comprises a transaction identifier; and
receiving a response to the request, wherein the response comprises the UE capabilities information and the transaction identifier;
subsequent to receiving the UE capabilities information, receiving, at the location server from the UE, an indication of an update to one or more of the parameters, the indication of the update to one or more of the parameters received according to a second capability indication procedure, wherein the second capability indication procedure comprises receiving, at the location server, (i) the updated UE capabilities information comprising the update, or (ii) the updated UE capabilities information and a parameter indicating an applicability of the updated UE capabilities information to the positioning session; and
sending, from the location server to the UE, a message responsive to the indication of the update to one or more of the parameters, the message comprising:
assistance data, based on the update to the one or more of the parameters, for the UE to use for measuring positioning reference signals,
a request for location information, or
a request for the updated UE capabilities information, or
a combination thereof.

15. The method of claim 14, further comprising:
receiving, at the location server from the UE, the location information, the location information indicative of measurements of positioning reference signals at the UE based on the update; and
determining a location of the UE based on the location information.

16. The method of claim 14, wherein the parameter comprises:

a timer expiration before which the updated UE capabilities information is valid, or a duration that is within the position session and during which the updated UE capabilities information is valid.

17. The method of claim 14, wherein the first capability indication procedure comprises receiving the UE capabilities information from the UE in response to sending a request from the location server for the UE capabilities information, wherein the second capability indication procedure comprises receiving at the location server from the UE, without the request for the updated UE capabilities information, the UE capabilities information that comprises the update.

18. The method of claim 17, further comprising sending, from the location server, initial assistance data separate from the assistance data, in response to the UE capabilities information sent according to the first capability indication procedure; and wherein sending the message comprises sending the assistance data based on the update, the assistance data comprising updated assistance data.

19. The method of claim 14, wherein the first capability indication procedure comprises receiving the UE capabilities information in response to a request by the location server for the UE capabilities information, wherein the second capability indication procedure comprises receiving, at the location server, an error message indicating that a previously reported capability is outdated.

20. A user equipment (UE) to send location information in association with a positioning session between the UE and a location server, the UE comprises:
   a transceiver;
   a memory; and
   one or more processors communicatively coupled with the transceiver and the memory, wherein the one or more processors are configured to:
      send, via the transceiver to the location server, UE capabilities information according to a first capability indication procedure, the UE capabilities information indicates parameters of the UE in support of: positioning reference signal (PRS) configurations, PRS measurements, positioning methods, or positioning procedures, or a combination thereof, wherein the one or more processors are configured to send the UE capabilities information according to the first capability indication procedure comprises the one or more processors are configured to send the UE capabilities information in response to a request of the location server for the UE capabilities information;
      determine an update to one or more of the parameters;
      send, via the transceiver to the location server, an indication of the update to one or more of the parameters according to a second capability indication procedure, wherein the one or more processors are configured to send the indication of the update to one or more of the parameters according to the second capability indication procedure comprises the one or more processors are configured to send via the transceiver to the location server, without a request of the location server for the updated UE capabilities information, the UE capabilities information that comprises the update;
      measure positioning reference signals at the UE based on the update; and
      send, via the transceiver to the location server, the location information based on the measurement.

21. The UE of claim 20, wherein:
   to send the UE capabilities information according to the first capability indication procedure, the one or more processors are configured to:
      receive a request of the location server for the UE capabilities information, wherein the request comprises a transaction identifier; and
      send a response to the request, wherein the response comprises the UE capabilities information and the transaction identifier; and
   to send the indication of the update to one or more of the parameters according to the second capability indication procedure, the one or more processors are configured to send, to the location server, (i) updated UE capabilities information that comprises the update, or (ii) the updated UE capabilities information and a parameter indicates an applicability of the updated UE capabilities information to the positioning session.

22. The UE of claim 20, wherein the one or more processors are further configured to:
   receive, via the transceiver from the location server, a location request for periodic location information reporting, wherein the second capability indication procedure comprises:
      determine, on a periodic basis, one or more changes to the UE capabilities information; and
      send, via the transceiver to the location server, updated UE capabilities information comprises the one or more changes.

23. The UE of claim 20, wherein the one or more processors are further configured to:
   receive, via the transceiver from the location server, assistance data in response to the UE capabilities information sent according to the first capability indication procedure, wherein the assistance data is associated with a transaction identifier;
   receive, via the transceiver from the location server, updated assistance data in response to updated UE capabilities information sent according to the second capability indication procedure, wherein the assistance data is associated with the transaction identifier; and
   perform the PRS measurements based on the updated assistance data.

24. A location server to enable updated UE capabilities information in association with a positioning session between a UE and the location server, the location server comprises:
   a transceiver;
   a memory; and
   one or more processors communicatively coupled with the transceiver and the memory, wherein the one or more processors are configured to:
      receive, via the transceiver from the UE, UE capabilities information according to a first capability indication procedure, the UE capabilities information indicating parameters of the UE in support of: positioning reference signal (PRS) configurations, PRS measurements, positioning methods, or positioning procedures, or a combination thereof, wherein the one or more processors are configured to receive the UE capabilities information according to the first capability indication procedure, the one or more processors are configured to:
         send a request for the UE capabilities information, wherein the request comprises a transaction identifier; and receive a response to the request, wherein the response comprises the UE capabilities information and the transaction identifier;

receive, at the location server from the UE, an indication of an update to one or more of the parameters, the indication of the update to one or more of the parameters received according to a second capability indication procedure, wherein the one or more processors are configured to receive the indication of the update to one or more parameters according to the second capability indication procedure, the one or more processors are configured to receive, at the location server, (i) the updated UE capabilities information comprises the update, or (ii) the updated UE capabilities information and a parameter indicating an applicability of the updated UE capabilities information to the positioning session; and send, via the transceiver to the UE, a message responsive to the indication of the update to one or more of the parameters, the message comprises:
- assistance data, based on the update to the one or more of the parameters, for the UE to use for measuring positioning reference signals,
- a request for location information, or
- a request for the updated UE capabilities information, or
- a combination thereof.

25. The location server of claim 24, wherein, to receive the UE capabilities information according to the first capability indication procedure, the one or more processors are configured to receive the UE capabilities information from the UE in response to a request from the location server for the UE capabilities information, and wherein to receive the indication of the update to one or more of the parameters according to the second capability indication procedure, the one or more processors are configured to receive, via the transceiver, without the request for the updated UE capabilities information, the UE capabilities information that comprises the update.

26. The location server of claim 24, wherein, to receive the UE capabilities information according to the first capability indication procedure, the one or more processors are configured to receive the UE capabilities information in response to a request by the location server for the UE capabilities information, wherein to receive the indication of the update to one or more of the parameters according to the second capability indication procedure, the one or more processors are configured to receive, via the transceiver, an error message indicating that a previously reported capability is outdated.

* * * * *